US012779706B1

(12) United States Patent
Hurst et al.

(10) Patent No.: US 12,779,706 B1
(45) Date of Patent: Nov. 3, 2026

(54) STATION FOR SWAPPING ROBOT END EFFECTOR AND RELATED TECHNOLOGY

(71) Applicant: Agility Robotics, Inc., Pittsburgh, PA (US)

(72) Inventors: Jonathan Hurst, Albany, OR (US); Jay Jasper, Albany, OR (US); Prasanna Velagapudi, Pittsburgh, PA (US)

(73) Assignee: Agility Robotics, Inc., Salem, OR (US)

( * ) Notice: Subject to any disclaimer, the term of this patent is extended or adjusted under 35 U.S.C. 154(b) by 329 days.

(21) Appl. No.: 18/733,647

(22) Filed: Jun. 4, 2024

Related U.S. Application Data

(60) Provisional application No. 63/650,516, filed on May 22, 2024, provisional application No. 63/635,571, filed on Apr. 17, 2024.

(51) Int. Cl.
*B25J 15/04* (2006.01)
*B25J 15/00* (2006.01)

(52) U.S. Cl.
CPC ....... *B25J 15/0491* (2013.01); *B25J 15/0066* (2013.01)

(58) Field of Classification Search
None
See application file for complete search history.

(56) References Cited

U.S. PATENT DOCUMENTS 4,996,753 A 3/1991 Jones
10,150,213 B1 12/2018 Linnell et al.
10,207,413 B2 2/2019 Maeda et al.
11,559,903 B2 1/2023 Menon et al.
2007/0216347 A1* 9/2007 Kaneko .................. B25J 19/005 320/107
2011/0231050 A1 9/2011 Goulding
2015/0148955 A1* 5/2015 Chin ...................... B25J 9/1602 901/41
2017/0066139 A1 3/2017 Corkum et al.
2017/0217013 A1 8/2017 Iqtidar et al.
2018/0257221 A1 9/2018 Toothaker et al.
2018/0272543 A1 9/2018 Kayama et al.
2020/0086437 A1 3/2020 Johnson et al.
2020/0276701 A1 9/2020 Lii et al.
2022/0135346 A1 5/2022 Matsuoka et al.
2022/0405506 A1 12/2022 Taamazyan et al.
(Continued)

FOREIGN PATENT DOCUMENTS

WO WO2020228946 11/2020
WO WO-2020228946 A1 * 11/2020 .......... B25J 15/0253

*Primary Examiner* — Christopher A Buksa

(57) ABSTRACT

A system in accordance with a particular embodiment of the present technology includes a legged mobile robot and a station operably associated with one another. The mobile robot is configured to move into a docked state at the station. The station includes a support through which it carries at least a portion of a weight of the mobile robot while the mobile robot is in the docked state. The system further includes a plurality of end effectors carried by the station. Individual end effectors of the plurality of end effectors are configured to be connected to the mobile robot via a distal end portion of an arm of the mobile robot while the mobile robot is in the docked state. The station also includes a charger through which it electrically charges a battery of the mobile robot while the mobile robot is in the docked state.

19 Claims, 26 Drawing Sheets

(56) References Cited

U.S. PATENT DOCUMENTS

| | | | |
|---|---|---|---|
| 2022/0409303 | A1 | 12/2022 | Kadshai et al. |
| 2022/0410412 | A1 | 12/2022 | Kastler et al. |
| 2023/0045591 | A1 | 2/2023 | de la Fuente Klein et al. |
| 2023/0081119 | A1 | 3/2023 | Rohanimanesh et al. |
| 2023/0124672 | A1 | 4/2023 | Menon et al. |
| 2023/0234246 | A1 | 7/2023 | Moineau-Dionne et al. |

* cited by examiner

STATION FOR SWAPPING ROBOT END EFFECTOR AND RELATED TECHNOLOGY

CROSS-REFERENCE TO RELATED APPLICATIONS

This claims the benefit of: (1) U.S. Provisional Application No. 63/635,571, filed Apr. 17, 2024; and (2) U.S. Provisional Application No. 63/650,516, filed May 22, 2024. The foregoing applications are incorporated herein by reference in their entirety. To the extent the foregoing applications or any other material incorporated by reference conflicts with the present disclosure, the present disclosure controls.

TECHNICAL FIELD

The present technology relates to mobile robots.

BACKGROUND

Much of the work that humans currently perform is amenable to automation using robotics. For example, significant human labor is currently directed to executing predefined movements of items and containers at order-fulfillment centers. Such predefined movements may occur many millions of times a day at a single order-fulfillment center and many billions of times a day across a network of order-fulfillment centers. Human labor would be better applied to more complex tasks, particularly those involving creativity, advanced problem solving, and social interaction. Presently, however, the need for order-fulfillment centers is large and rapidly increasing. Some analysts forecast a shortage of a million or more workers to staff order-fulfillment centers within the next ten to fifteen years. Due to the importance of this field, even small improvements in efficiency can have major impacts on macroeconomic productivity. For at least these reasons, there is a significant and growing need for innovation that supports automating tasks that humans currently perform at order-fulfillment centers and elsewhere.

BRIEF DESCRIPTION OF THE DRAWINGS

Certain aspects of the present technology can be better understood with reference to the following drawings. The relative dimensions in the drawings may be to scale with respect to some embodiments of the present technology. With respect to other embodiments, the drawings may not be to scale. The drawings may also be enlarged arbitrarily. For clarity, reference-number labels for analogous components or features may be omitted when the appropriate reference-number labels for such analogous components or features are clear in the context of the specification and all of the drawings considered together. Furthermore, the same reference numbers may be used to identify analogous components or features in multiple described embodiments.

DETAILED DESCRIPTION

Figure 1:
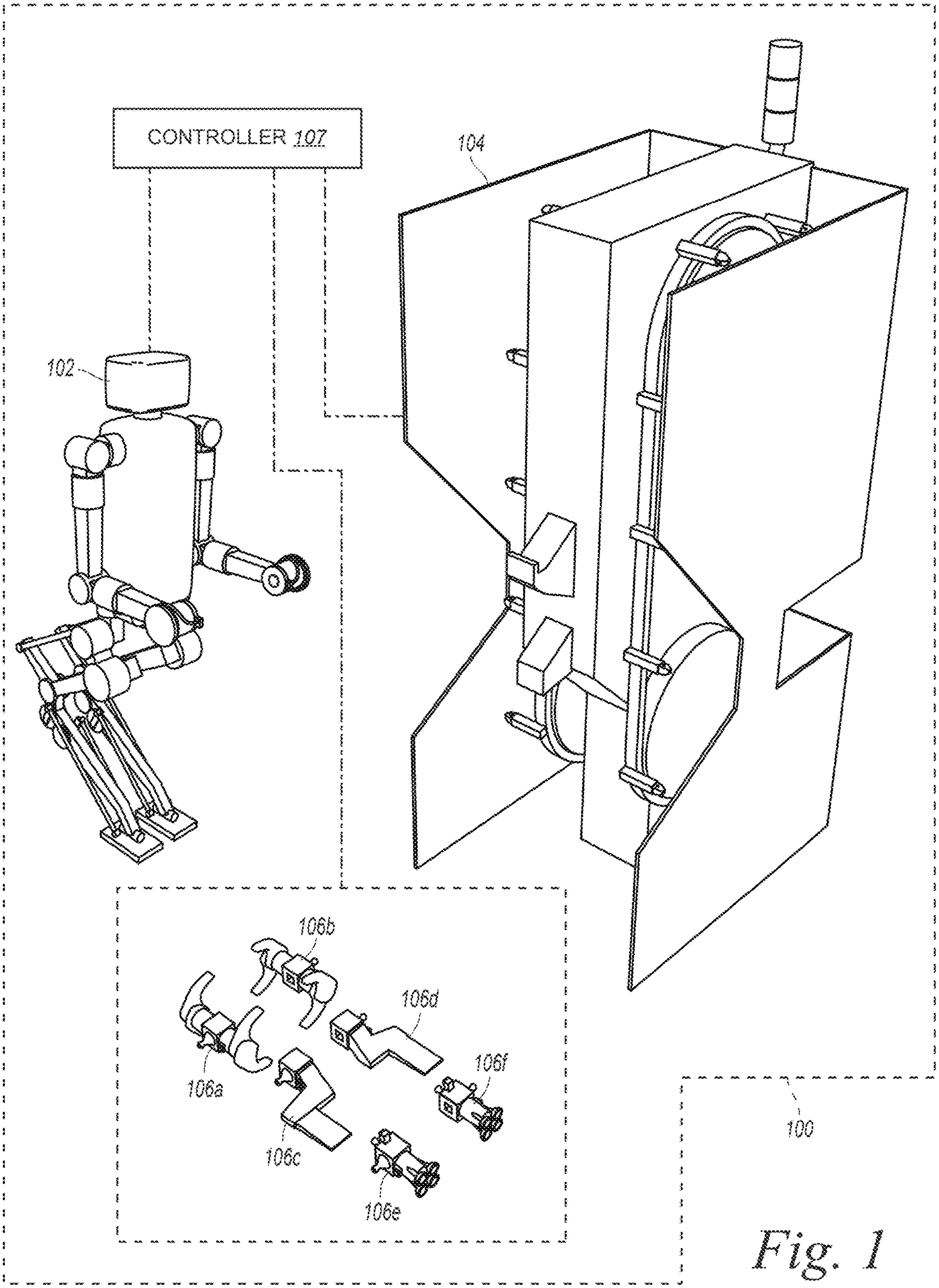
FIG. 1 is a perspective view of a system in accordance with at least some embodiments of the present technology.
Figure 2:
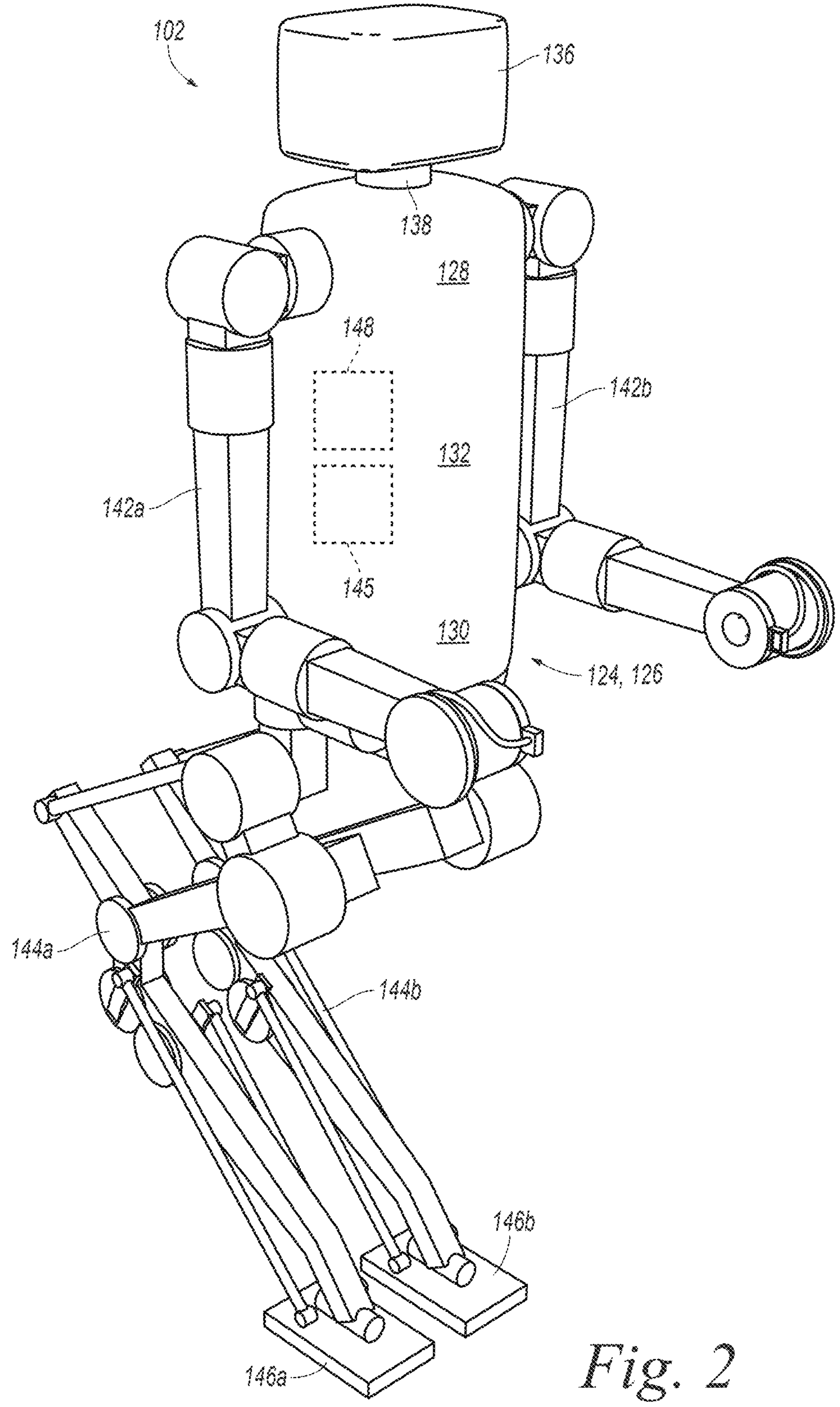
FIGS. 2-5 are, respectively, a perspective view, a front profile view, a side profile view, and a top plan view of a mobile robot of the system of FIG. 1.
Figure 3:
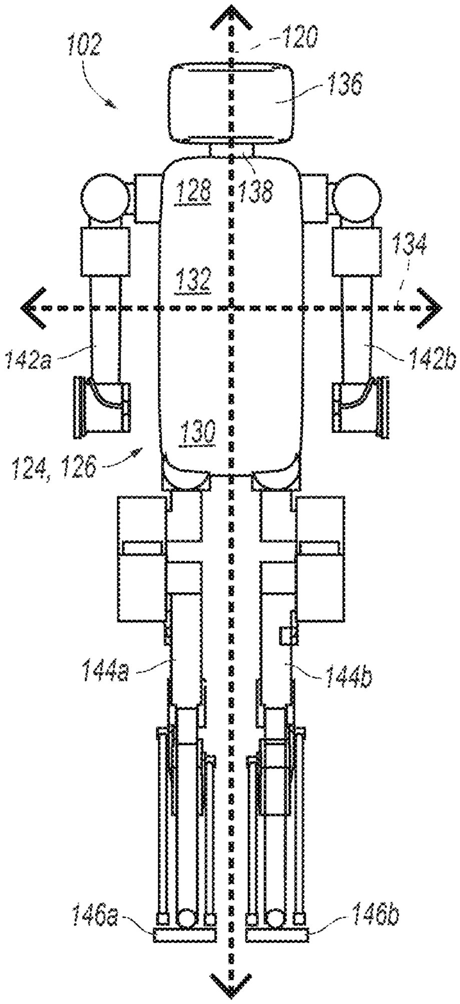

At a high level, order fulfillment involves receiving goods, storing the goods in inventory, retrieving the goods from inventory as needed, and packaging the goods for shipment to consumers in response to orders. In the context of online retail, these operations typically occur at an order-fulfillment center. For online retailers, the efficiency of order fulfillment is often the primary determinant of cost and profit. It also tends to dictate how long consumers must wait between placing an order and receiving the ordered goods. As the percentage of retail conducted online increases, the importance of innovations related to order fulfillment also increases. Indeed, a relentless focus on order-fulfillment technology in online retail and related industries in recent years has provided consumers with access to fast and low-cost home delivery of millions of different products. In some cases, goods may move from inventory to a consumer's doorstep on demand in just a few hours. Not long ago, this level of convenience would have been difficult to imagine.

Aside from packing and unpacking, most order-fulfillment operations involve moving goods from one place to another. In an example of a typical end-to-end order-fulfillment process, goods are, in order, depalletized, singulated, stowed, stored, retrieved, sorted, packaged, and palletized. Modern order-fulfillment processes do not store goods in inventory by category. Rather, individual items within certain thresholds of size and weight are inventoried randomly. The location of every item is cataloged in a database that updates automatically as the items move. For example, a human worker moving an item may scan a barcode on the item to change the location of the item in the database. Although human workers currently do much of the actual moving of items, computer systems often coordinate this movement. For example, computer systems can generate instructions to move items into and out of inventory in concert with customer orders. Very little human reasoning is involved in any individual aspect of implementing this coordinated movement of items. Large numbers of human workers, however, are still needed for conventional order-fulfillment centers to operate. Operating a single, full-scale order-fulfillment center, for example, can require over one thousand full-time human workers. Human workers, of course, are expensive to retain and support, but their flexibility is invaluable. Among other types of flexibility, a human worker can easily switch from performing one task to performing another task. Such flexibility has conventionally been unavailable in automated systems.

Most of the innovation in order fulfillment to date has involved automating specific operations in an order-fulfillment workflow. For example, presently available automated storage and retrieval systems bring inventory totes to human workers rather than requiring human workers to travel to the inventory totes. As another example, presently available automated put walls sort batch-picked items into order-specific totes rather than relying on human workers for this tedious task. These and other forms of automation, while extremely useful, are limited in that they still rely on human intervention both immediately upstream and immediately downstream. These and similar systems, therefore, effectively create "islands of automation" in human-centric workflows. Moreover, the equipment associated with such systems tends to be purpose-built and, therefore, may be difficult or impossible to modify to accommodate changes in demand for various operations within an order-fulfillment workflow. Such changes, however, are inevitable. As one example, demand for operations related to unpacking and storing goods typically increases shortly before traditional shopping seasons and then decreases during these seasons. Correspondingly, demand for operations related to retrieving and packaging goods typically increases during traditional shopping seasons and then decreases after these seasons. End-to-end automation using conventional automation systems built for maximum possible capacities across all variable-demand operation types within an order-fulfillment workflow would be highly impractical. In real-world implementations, a necessary balancing of capital efficiency with throughput prevents automation from reaching its full potential. For these and/or other reasons, there is a need for automation with flexibility rivaling that of a human workforce.

Devices, systems, and methods in accordance with at least some embodiments of the present technology include one or more innovations related to using mobile robots to improve order fulfillment. In particular, a system in accordance with at least some embodiments of the present technology includes a mobile robot, end effectors, and a station at which the mobile robot can change one or more equipped end effector with little or no human involvement. With support from the station, the mobile robot can use different end effectors to execute different operations in an order-fulfillment workflow. Furthermore, changing the equipped end effectors of mobile robots in a fleet can change an allocation of the mobile robots so as to adapt to changes in demand for operations of different types in the order-fulfillment workflow and/or to changes in execution of such operations independent of changes in demand. Thus, rather than acting as a purpose-built and static automation, the fleet acts as a multi-purpose and dynamic automation. Moreover, the fleet can be integrated with a human workforce such that the allocation of mobile robots within the fleet further adapts to changes in the human workforce. In at least some cases, mobile robots and human workers are effectively interchangeable in the order-fulfillment system. Furthermore, the order-fulfillment system can simplify adding and adjusting capacities of order-fulfillment centers as needed in response to demand. For example, base-form mobile robots and/or extra end effectors can be reallocated not only to compensate for deficiencies in an order-fulfillment workflow at a single order-fulfillment center, but to accommodate changes in overall demand for operations between order-fulfillment centers within a geographically dispersed network.

The foregoing and other features of devices, systems, and methods in accordance with various embodiments of the present technology are further described below with reference to FIGS. 1-34. Although methods, devices, and systems may be described herein primarily or entirely in the context of bipedal, bimanual, mobile robots at order-fulfillment centers, other contexts are within the scope of the present technology. For example, suitable features of described methods, devices, and systems can be implemented in the contexts of non-legged mobile robots (e.g., wheeled mobile robots, tracked mobile robots, etc.), single-armed mobile robots, and mobile robots with more than two arms. Furthermore, suitable features of described methods, devices, and systems can be implemented in contexts other than order-fulfillment, such as contexts involving managing parts and supplies in manufacturing workflows. Finally, it should be understood, in general, that other methods, devices, and systems in addition to those disclosed herein are within the scope of the present technology. For example, methods, devices, and systems in accordance with embodiments of the present technology can have different or additional configurations, components, procedures, etc. than those disclosed herein. Moreover, methods, devices, and systems in accordance with embodiments of the present technology can be without one or more of the configurations, components, procedures, etc. disclosed herein without deviating from the present technology.

Examples of Systems

FIG. 1 is a perspective view of a system 100 in accordance with at least some embodiments of the present technology. The system 100 can include a mobile robot 102, a station 104, end effectors 106 (individually identified as end effectors **106*a*-106*f*), and a controller 107 operably associated with one another. The mobile robot 102 and the station 104 can be configured, respectively, to equip and to carry the end effectors 106. As described below, the mobile robot 102 can be configured to move into a docked state at the station 104. While the mobile robot 102** is in a docked state at the station 104 and/or at other suitable times, the station 104 can facilitate changing one or more of the end effectors 106*a*-106*f* equipped via the mobile robot 102. In the illustrated embodiment, the end effectors 106*a*-160*f* include six unique combinations of type and chirality. Three types illustrated are pincher-type (end effectors 106*a*, 106*b*), scraper-type (end effectors 106*c*, 106*d*), and suction-type (end effectors 106*e*, 106*f*). Two chiralities illustrated are right handed (end effectors 106*a*, 106*c*, 106*e*) and left handed (end effectors 106*b*, 106*d*, 106*f*). In other embodiments, counterparts of the system 100 can include different quantities, types, chiralities, etc. of constituent end effectors. Moreover, counterparts of the system 100 can include different quantities, types, etc. of constituent mobile robots and stations.

With reference again to the illustrated embodiment, FIGS. 2-5 are, respectively, a perspective view, a front profile view, a side profile view, and a top plan view of the mobile robot 102. As shown in FIGS. 2-5, the mobile robot 102 can include structures resembling human anatomy with respect to the features, positions, or other characteristics of such structures. In at least some cases, the mobile robot 102 defines a midsagittal plane 120 about which the mobile robot 102 is bilaterally symmetrical. In these and other cases, the mobile robot 102 can be configured for bipedal locomotion similar to that of a human. The mobile robot 102 can further define a coronal plane 122 perpendicular to the midsagittal plane 120. Counterparts of the mobile robot 102 can have other suitable forms and features. For example, a counterpart of the mobile robot 102 can have a non-humanoid form, such as a canine form, an insectoid form, an arachnoid form, or a form with no animal analog. Furthermore a counterpart of the mobile robot 102 can be asymmetrical or have symmetry other than bilateral. Still further, a counterpart of the mobile robot 102 can be configured for non-bipedal locomotion. For example, a counterpart of the mobile robot 102 can be configured for another type of legged locomotion (e.g., quadrupedal locomotion, hexapedal locomotion, octopedal locomotion, etc.) or non-legged locomotion (e.g., wheeled locomotion, continuous-track locomotion, etc.).

With reference again to FIGS. 2-5, the mobile robot 102 can include a centrally disposed body 124 through which other structures of the mobile robot 102 are interconnected. As all or a portion of the body 124, the mobile robot 102 can include a torso 126 having a superior portion 128, an inferior portion 130, and an intermediate portion 132 therebetween. The mobile robot 102 can define a transverse plane 134 from which the superior and inferior portions 128, 130 of the torso 126 are respectively superiorly and inferiorly spaced apart. The transverse plane 134 can be perpendicular to the midsagittal plane 120 and perpendicular to the coronal plane 122. The mobile robot 102 can further include a head 136 superiorly spaced apart from the torso 126. The mobile robot 102 can also include a neck 138 through which the head 136 is connected to the torso 126 via the superior portion 128 of the torso 126. The mobile robot 102 can further include posterior projections 140*a*, 140*b* extending posteriorly from the torso 126, with the posterior projection 140*a* being superior relative to the posterior projection 140*b*. In at least some cases, at least one of the posterior projections 140*a*, 140*b* is a handle.

The mobile robot 102 can further include articulated appendages carried by the torso 126. Among these articulated appendages, the mobile robot 102 can include arms 142 (individually identified as arms 142*a*, 142*b*) and legs 144 (individually identified as legs 144*a*, 144*b*). At individual articulations of the arms 142*a*, 142*b* and legs 144*a*, 144*b*, the mobile robot 102 can include a joint and a corresponding actuator, such as a rotary actuator with a motor and gearing (e.g., cycloidal gearing or strain-wave gearing). For clarity of illustration, the joints are not labeled in FIGS. 2-5. The actuators are shown schematically and collectively as actuators 145 in FIG. 2. In at least some cases, the mobile robot 102 is configured to manipulate objects via the arms 142*a*, 142*b*, such as bimanually. In these and other cases, the mobile robot 102 can be configured to ambulate via the legs 144*a*, 144*b*, such as bipedally. Thus, the mobile robot 102 can be bimanual and bipedal. The arms 142*a*, 142*b* and the legs 144*a*, 144*b* can separately extend from the body 124 and define respective kinematic chains. The kinematic chains corresponding to the arms 142*a*, 142*b* can provide at least five degrees of freedom, such as exactly five or exactly six degrees of freedom. The kinematic chains corresponding to the legs 144*a*, 144*b* can provide at least four degrees of freedom, such as exactly four, exactly five, or exactly six degrees of freedom. As parts of the legs 144*a*, 144*b*, the mobile robot 102 can include feet 146*a*, 146*b* at distalmost portions of the corresponding kinematic chains. Thus, the legs 144*a*, 144*b* can distally carry the feet 146*a*, 146*b*, respectively.

The mobile robot 102 can further include sensors 148 (shown schematically and collectively in FIG. 2) for capturing, providing, and/or analyzing information about the mobile robot 102 itself and/or the environment in which the mobile robot 102 operates. The sensors 148 can include perception sensors that emit and/or receive optical, audio, electromagnetic, and/or other types of signals. Examples of potentially useful perception sensors include cameras (e.g., red-green-blue (RGB) cameras, infrared cameras, stereoscopic cameras, etc.), light detection and ranging (LIDAR) sensors, sound navigation and ranging (SONAR) sensors, and Global Positioning System (GPS) sensors. Within the body 124 and/or at one or more other suitable locations, the mobile robot 102 can include among the sensors 148, an accelerometer, a gyroscope, a magnetometer, and/or a tilt sensor, among other examples. At the feet 146*a*, 146*b* and/or at one or more other suitable locations, the mobile robot 102 can include among the sensors 148, a contact sensor and/or a force sensor, among other examples. In at least some cases, two or more different types of sensors are incorporated into a sensor assembly of the mobile robot 102. For example, an accelerometer, a gyroscope, and a magnetometer can be incorporated into an inertial measurement unit (IMU) through which the mobile robot 102 can determine parameters such as acceleration, angular velocity, and orientation. The mobile robot 102 can include an IMU within the torso 105, within the head 136, and/or at one or more other suitable locations.

At one, some, or all of the actuators 145 and/or at one or more other suitable locations, the mobile robot 102 can include among the sensors 148, sensors that measure properties of the corresponding joints. Such properties can include position, orientation (e.g., yaw, pitch, and roll), applied force (e.g., torque), elevation, mass, velocity, and acceleration, among other examples. The measurements of these properties can be direct or indirect. As an example of direct sensing, the mobile robot 102 may sense a torque acting on a given joint via a torque sensor operably associated with the joint, such as a torque sensor that outputs torque as function of electrical current. As another example of direct sensing, the mobile robot 102 may sense a position of a given joint via an encoder operably associated with the joint. In at least some cases, the mobile robot 102 monitors itself and/or its environment in real-time and/or in near real-time. Moreover, the mobile robot 102, the controller 107, and/or another suitable component of the system 100 may use acquired sensor data as a basis for decision-making.

Figure 4:
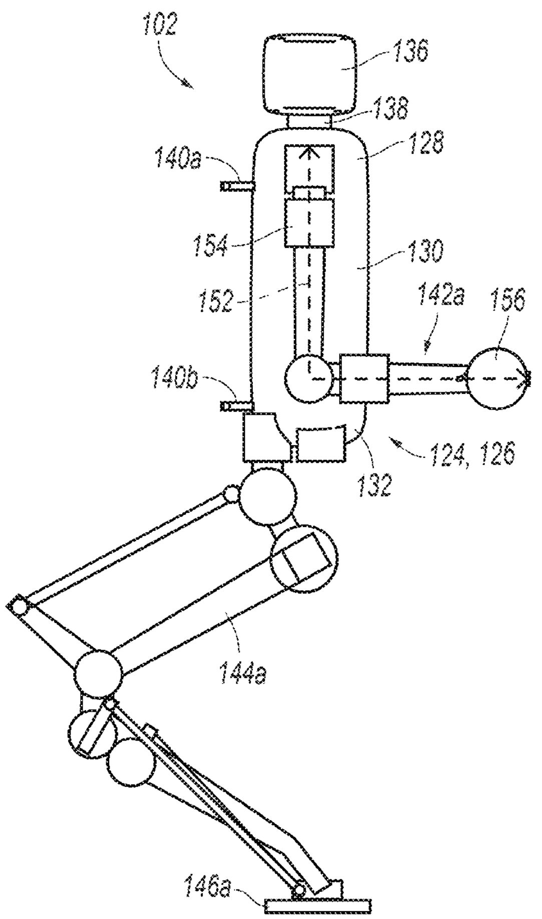
Figure 5:
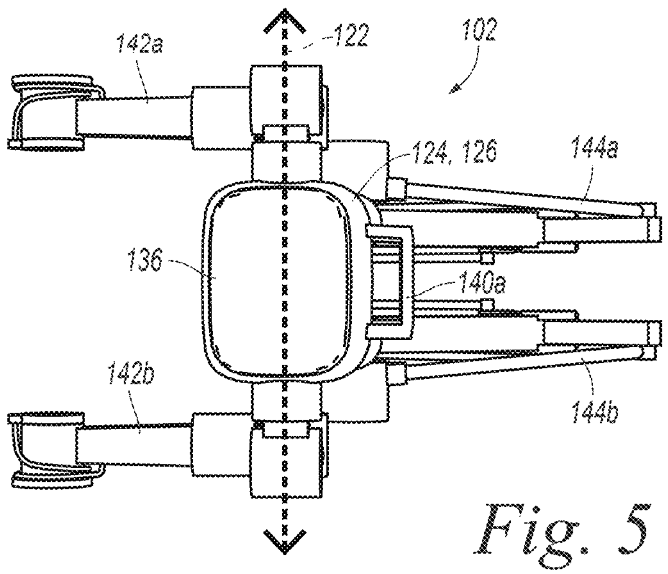
Figure 6:
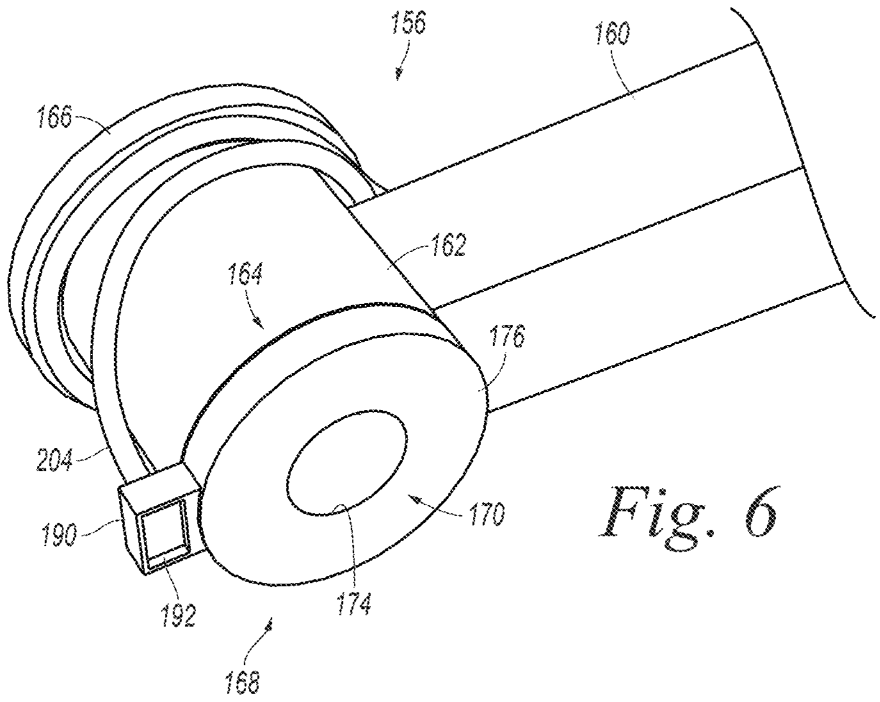
FIG. 6 is an enlarged perspective view of a distal end portion of an arm of the mobile robot of the system of FIG. 1.
Figure 7:
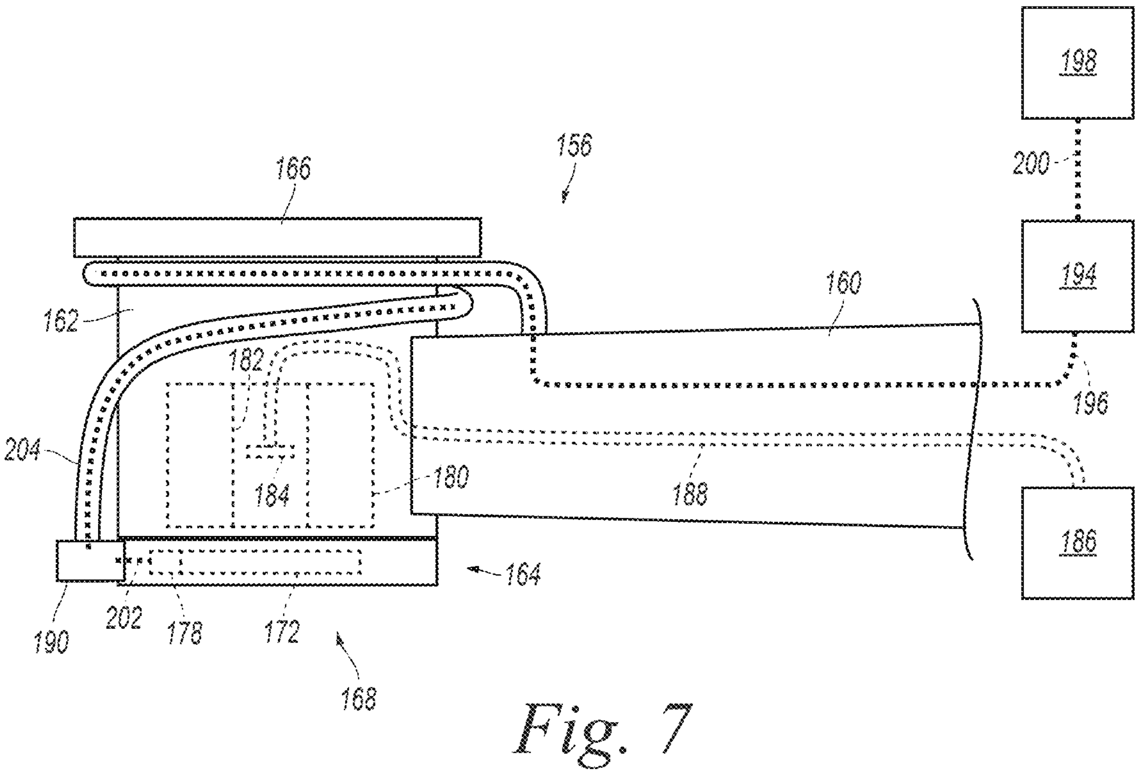
FIG. 7 is an enlarged top plan view of the distal end portion of the arm of the mobile robot of the system of FIG. 1 and associated subcomponents of the system.

As shown in FIG. 4, the arm 142*a* can define an arm length 152. The arm 142*a* can include a proximal end portion 154 through which the arm 142*a* is connected to the body 124. The arm 142*a* can further include a distal end portion 156 opposite to the proximal end portion 154 of the arm 142*a* along the arm length 152. Reference numbers used herein for features of the arm 142*a* and of the mobile robot 102 at the arm 142*a* may also be used herein for corresponding features of the arm 142*b* and of the mobile robot 102 at the arm 142*b*. The arm 142*b* can be similar to the arm 142*a* but with the opposite chirality. FIG. 6 is an enlarged perspective view of the distal end portion 156 of the arm 142*a*. FIG. 7 is an enlarged top plan view of the distal end portion 156 of the arm 142*a* and associated components of the mobile robot 102. With reference now to FIGS. 2-7 together, the mobile robot 102 can include as parts of the arm 142*a*, a proximal body 160 and a distal body 162 at progressively more distal portions of the arm 142*a* along the arm length 152. The mobile robot 102 can further include a mount 164 and a flange 166 at opposite respective ends of the distal body 162 along a dimension of the distal body 162 perpendicular to the arm length 152.

The mobile robot 102 can further include a deployment connector 168 at the distal end portion 156 of the arm 142*a* through which the mobile robot 102 is configured to swappably carry at least one of the end effectors 106*a*-106*f*. As parts of the deployment connector 168, the mobile robot 102 can include a receptacle 170 at the mount 164 and at the distal body 162. The deployment connector 168 can further include a clamp 172 (shown schematically) at the receptacle 170. The mount 164 can define a central opening 174 and an annular frame 176 around the central opening 174. The clamp 172 can be at least partially disposed at the annular frame 176 and can extend around the central opening 174. In at least some cases, the clamp 172 includes a chuck, a collet, or another gripping mechanism, which can be auto-centering. Furthermore, the clamp 172 can be motorized. For example, the deployment connector 168 can include an electrical motor 178 (also shown schematically) configured to tighten or loosen the clamp 172 in response to one or more signals. Within the distal body 162, the mobile robot 102 can include a rotary actuator 180 configured to rotate the mount 164 relative to the distal body 162. The rotary actuator 180 can have an annular form that defines a through bore 182.

In at least some cases, the deployment connector 168 includes a fluidic port 184 at the through bore 182. In these and other cases, the mobile robot 102 can include a pump 186 and a conduit 188 extending along the arm length 152 between the fluidic port 184 and the pump 186. The pump 186 is shown schematically in FIG. 7 and can be disposed at the distal body 162, at the proximal body 160, at a more proximal portion of the arm 142*a*, at the torso 126, or at another suitable portion of the mobile robot 102. Through the pump 186, the conduit 188, and the fluidic port 184, the mobile robot 102 can be configured to provide negative or positive pressure to an end effector connected to the arm 142*a*. In this or another suitable manner, the mobile robot 102 can be compatible with end effectors that apply suction for gripping, with end effectors that apply compressed air for cleaning, with pneumatic end effectors, with hydraulic end effectors, and/or with other end effectors that make use of negative or positive pressure.

The mobile robot 102 can further include features for electrical power and communication connectivity an end effector carried by the arm 142*a*. As shown in FIGS. 6 and 7, the mount 164 can include a tab 190 extending radially outward from the annular frame 176. The deployment connector 168 can include an electrical port 192 at the tab 190. The mobile robot 102 can also include a battery 194 and a lead 196 extending along the arm length 152 of the arm 142*a* between the electrical port 192 and the battery 194. The battery 194 is shown schematically in FIG. 7 and can be disposed at the distal body 162, at the proximal body 160, at a more proximal portion of the arm 142*a*, at the torso 126, or at another suitable portion of the mobile robot 102. The mobile robot 102 can further include a charger 198 (also shown schematically) and another lead 200 extending between the charger 198 and the battery 194. In at least some cases, the charger 198 includes an electrode (not shown) at one or both of the posterior projections 140*a*, 140*b* (FIG. 4). In these and other cases, the mobile robot 102 can be configured to operate wirelessly via the battery 194 and to recharge the battery 194 via the charger 198. The mobile robot 102 can further include another lead 202 extending between the electrical port 192 and the electrical motor 178.

In the illustrated case, the lead 196 between the electrical port 192 and the battery 194 includes slack at the distal end portion 156 of the arm 142*a* to accommodate movement of the mount 164 relative to the distal body 162. The mobile robot 102 can include a flexible conduit 204 containing this slack. The flexible conduit 204 can extend proximally from the electrical port 192, wrap around the distal body 162, and then extend into the proximal body 160. When the mount 164 rotates in one direction or the other relative to the distal body 162, the flexible conduit 204 can tighten or loosen, respectively, around the distal body 162. The flange 166 can help to retain the flexible conduit 204 at the distal end portion 156 of the arm 142*a*. In the illustrated case, the lead 196 and the flexible conduit 204 include one winding around the distal body 162. In other cases, counterparts of the lead 196 and the flexible conduit 204 can include more than one winding. In still other cases, a counterpart of the deployment connector 168 can include an electrical interface that accommodates relative movement at the receptacle 170, such as at or near the fluidic port 184. In these and other cases, the flexible conduit 204 and at least some of the slack in the lead 196 may be unnecessary.

Figure 8:
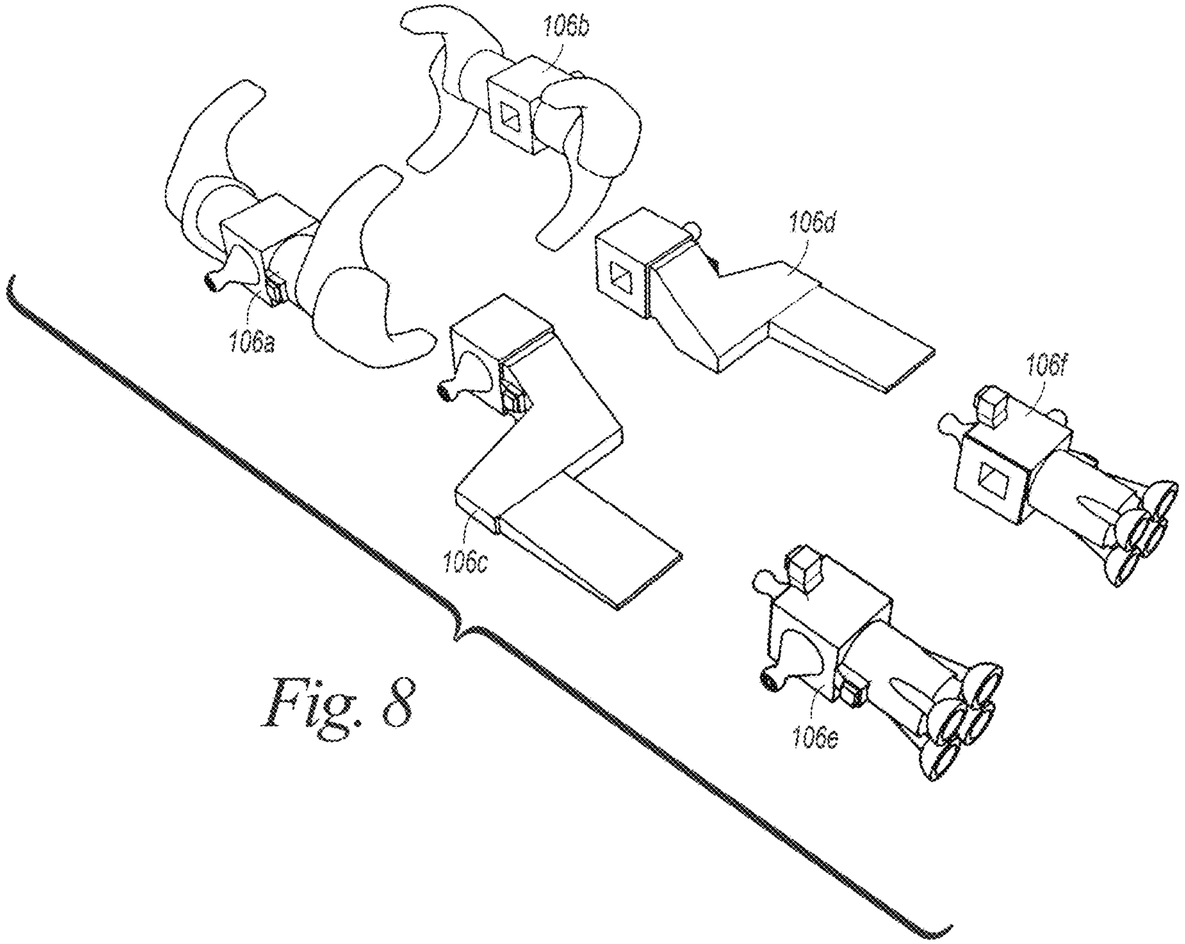
FIG. 8 is a perspective view of end effectors of the system of FIG. 1.

FIG. 8 is a perspective view of the end effectors 106. As discussed above, the end effectors 106*a*-106*f* are merely examples. It is expected that counterparts of the system 100 may include many more end effectors of many more types. A counterpart of the end effectors 106 as a set, for example, may include general-purpose end effectors, special-purpose end effectors, spare end effectors, replacement end effectors, production end effectors, prototype end effectors, etc. Furthermore, counterparts of the constituent end effectors 106*a*-106*f* can have features corresponding to any compatible handheld tools, such as hammers, saws, chisels, screwdrivers, planes, wrenches, pliers, brushes, grippers, cutters, welders, drillers, grinders, scrapers, etc. Counterparts of the end effectors 106*a*-106*f* can have features for manipulating, such as via passive, mechanical, electrical, pneumatic, hydraulic, magnetic, and/or other modalities. Moreover, counterparts of the end effectors 106*a*-106*f* can include features for sensing, such as cameras, scanners, probes, gauges, etc. Still further, counterparts of the end effectors 106*a*-106*f* can include auxiliary power components, such as auxiliary batteries, auxiliary charging interfaces, etc.

Figure 9:
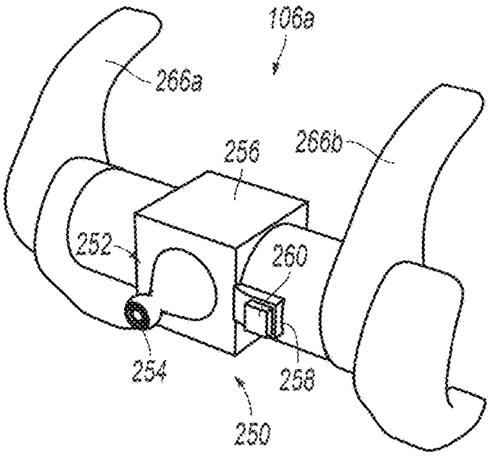
FIGS. 9 and 10 are, respectively, different perspective views of a pincer-type end effector among the end effectors of the system of FIG. 1.
Figure 10:
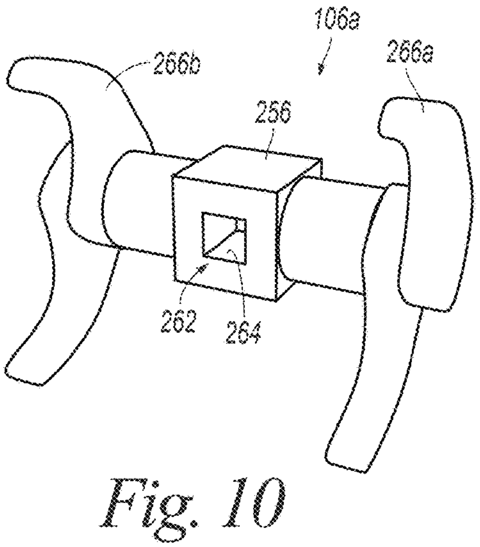

With reference again to the illustrated embodiment, FIGS. 9 and 10 are, respectively, different perspective views of the end effector 106*b* as an example of a pincer-type end effector. Reference numbers used herein for features of the end effector 106*b* may also be used herein for corresponding features of the end effector 106*b*, which is similar to the end effector 106*a* but with the opposite chirality. With primary reference to FIGS. 6-10 together, the end effector 106*a* can include a deployment connector 250 through which the end effector 106*a* is configured to be connected to the mobile robot 102 via a distal end portion of the arm 142*a*. The deployment connector 250 can be complementary with the deployment connector 168 of the mobile robot 102. In at least some cases, the deployment connector 250 includes a spindle 252. The receptacle 170 of the deployment connector 168 can be configured to receive the spindle 252 in a mating configuration. For example, when the deployment connectors 168, 250 are connected, the spindle 252 can extend through the central opening 174 and into the through bore 182. The clamp 172 can engage the spindle 252, thereby securing the end effector 106*a* to the mount 164. The deployment connector 250 can further include a fluidic port 254 complementary with the fluidic port 184 of the deployment connector 168. For example, the fluidic ports 184, 254 can be configured to be operably connected to one another when the deployment connectors 168, 250 are operably connected to one another. In at least some cases, the fluidic ports 184, 254 include structures configured to create a dynamic seal, such as lubricated rubber washers, o-rings, etc. (not shown). In the illustrated case, the end effector 106*a* is electromechanical and does not rely on a fluidic connection with the mobile robot 102. Accordingly, the spindle 252 can include a plug (not shown) downstream from the fluidic port 254.

As shown in FIG. 9, the end effector 106*a* can include an intermediate body 256 carrying the spindle 252. The end effector 106*a* can further include a tab 258 extending radially outward from the intermediate body 256. The deployment connector 250 can include an electrical plug 260 at the tab 258. The electrical plug 260 can be complementary with the electrical port 192 of the deployment connector 168. For example, the electrical port 192 and the electrical plug 260 can be configured to be operably connected to one another when the deployment connectors 168, 250 are operably connected to one another. In at least some cases, the electrical port 192 and the electrical plug 260 are at least partially self-aligning, such as via one or more complementary magnetic couplers (not shown) at the tabs 190, 258. In these and other cases, moving the electrical port 192 and the electrical plug 260 toward one another can cause respective electrodes of the deployment connectors 168, 250 to move into contact with one another, thereby facilitating communication and/or power delivery between the end effector 106*a* and the mobile robot 102. In at least some embodiments, the end effector 106*a* includes an auxiliary battery (not shown) that charges via the electrical port 192 and the electrical plug 260. Furthermore, the end effector 106*a* can include a sensor (not shown) that communicates with the mobile robot 102 via the electrical port 192 and the electrical plug 260.

As shown in FIG. 10, end effector 106*a* can include a storage connector 262 separate from the deployment connector 250. The end effector 106*a* can be configured to be carried by the station 104 via the storage connector 262. In the illustrated case, the storage connector 262 includes a polygonal socket 264. Furthermore, the storage connector 262 and the deployment connector 250 are at opposite respective sides of the intermediate body 256. In other cases, counterparts of the storage connector 262 and the deployment connector 250 can have other suitable forms and/or arrangements. Moreover, as discussed below, a counterpart of the end effector 106*a* can include more than one deployment connector 250 and/or more than one storage connector 262, such as to facilitate deployment and/or storage of the counterpart end effector in more than one orientation relative to the mobile robot 102 or relative to the station 104, respectively. With reference again to FIGS. 9 and 10, the end effector 106*a* can include pincers 266*a*, 266*b* spaced apart from one another in a dimension perpendicular to a dimension in which the deployment connector 250 and the storage connector 262 are spaced apart from one another.

Figure 11:
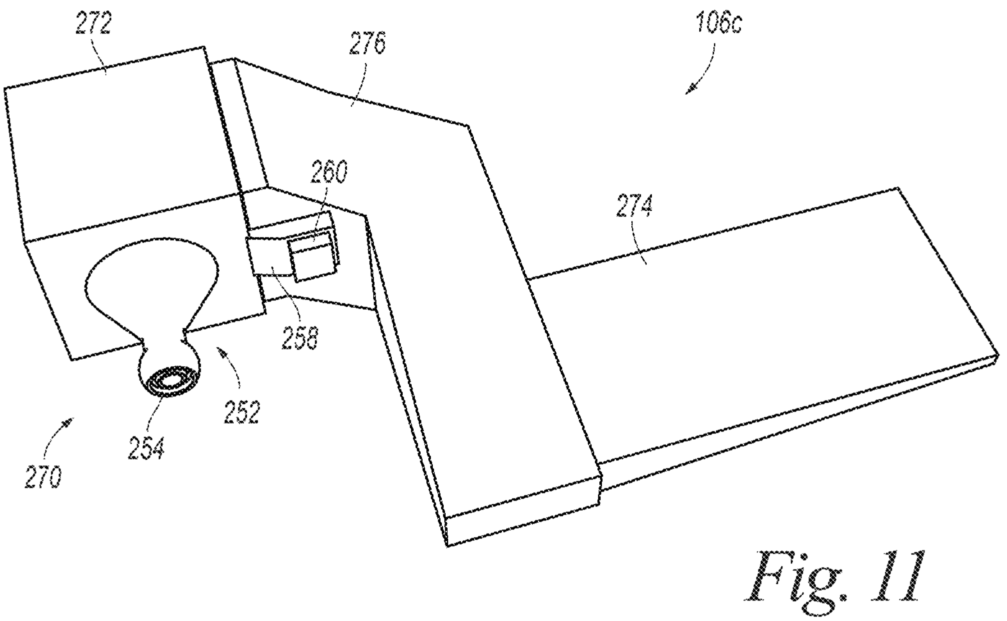
FIG. 11 is a perspective view of a scraper-type end effector among the end effectors of the system of FIG. 1.

FIG. 11 is a perspective view of the end effector 106*c* as an example of a scraper-type end effector among the end effectors 106. Reference numbers used herein for features of the end effector 106*c* may also be used herein for corresponding features of the end effector 106*d*, which is similar to the end effector 106*c* but with the opposite chirality. As shown in FIG. 11, the end effector 106*c* can include a deployment connector 270 having features the same as or similar to features of the deployment connector 250 of the end effector 106*a*. Features of the deployment connector 270 corresponding to features of the deployment connector 250 are shown in FIG. 11 with the same reference numbers. The end effector 106*c* can also include a storage connector (not shown in FIG. 11) having features the same as or similar to features of the storage connector 262 of the end effector 106*a*. The end effector 106*c* can further include a base 272 carrying the deployment connector 270 and the storage connector. The deployment connector 270 and the storage connector of the end effector 106*c* can be at opposite respective sides of the base 272. The end effector 106*c* can also include a scraper 274 and a bracket 276 extending between the base 272 and the scraper 274. The bracket 276 can cause the scraper 274 to have a desired lateral offset from the base 272.

Figure 12:
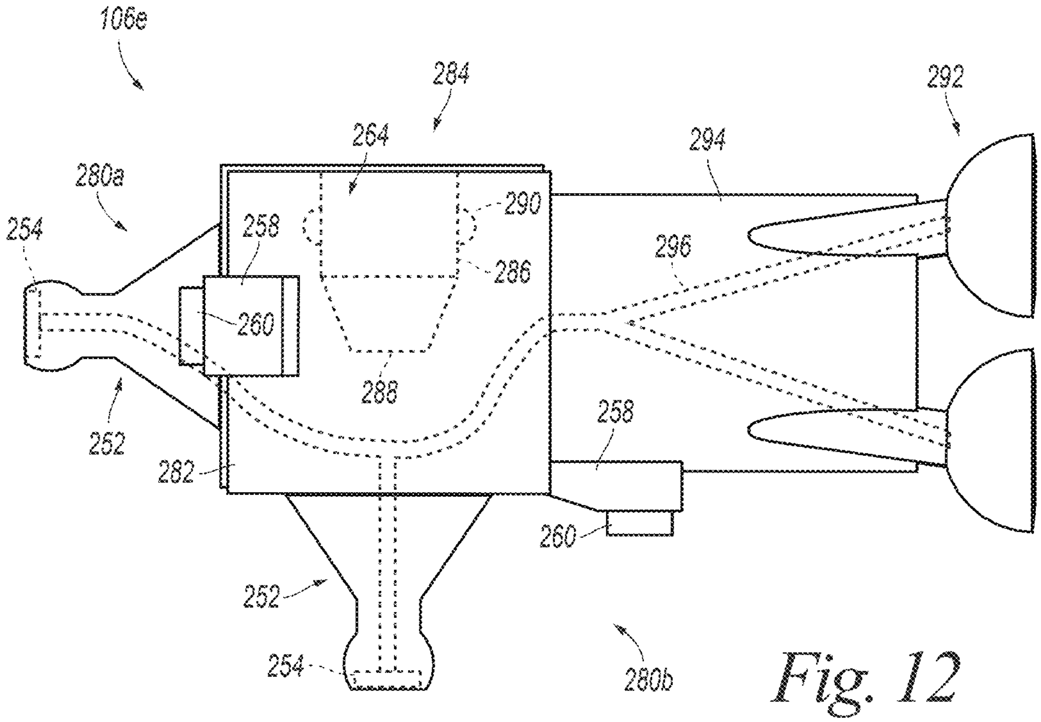
FIG. 12 is a top plan view of a suction-type end effector among the end effectors of the system of FIG. 1.

FIG. 12 is a top plan view of the end effector 106*e* as an example of a suction-type end effector among the end effectors 106. Reference numbers used herein for features of the end effector 106*e* may also be used herein for corresponding features of the end effector 106*f*, which is similar to the end effector 106*e* but with the opposite chirality. As shown in FIG. 12, the end effector 106*e* can include two deployment connectors 280 (individually identified as deployment connectors 280*a*, 280*b*) and a base 282 carrying the deployment connectors 280. As with the end effector 106*c*, the deployment connectors 280*a*, 280*b* can have features the same as or similar to features of the deployment connector 250 of the end effector 106*a*. Features of the deployment connector 280*a*, 280*b* corresponding to features of the deployment connector 250 are shown in FIG. 12 with the same reference numbers. The end effector 106*e* can also include a storage connector 284 having features the same as or similar to features of the storage connector 262 of the end effector 106*a*. Features of the storage connector 284 corresponding to features of the storage connector 262 are also shown in FIG. 12 with the same reference numbers. As further shown in FIG. 12, the polygonal socket 264 of the storage connector 284 can taper inwardly as it extends into the base 282. In particular, the polygonal socket 264 can include a first segment 286 having little or no taper and a deeper second segment 288 having a significant inward taper. These and/or other features of the polygonal socket 264 can facilitate alignment of the storage connector 284 with a complementary storage connector (not shown) of the station 104. Furthermore, the storage connector 284 can include indentations 290 (one labeled) at the first segment 286. The indentations 290 can receive protrusions (not shown) of a complementary storage connector of the station

104, such as to facilitate releasable securement of the storage connector 284 and the complementary storage connector of the station 104.

The end effector 106*e* can further include a suction cup array 292 and a manifold 294 extending between the base 282 and the suction cup array 292. The end effector 106*e* can define an internal fluidic channel 296 extending between the deployment connectors 280 and the suction cup array 292 via the base 282 and the manifold 294. The deployment connector 280*b* and the storage connector 284 can be at opposite respective sides of the base 282. In contrast, the deployment connector 280*a* and the storage connector 284 can be at respective sides of the base 282 perpendicular to one another. The end effector 106*e* can be configured to be deployed via either of the deployment connectors 280*a*, 280*b*. In at least some cases, the fluidic ports 254 of the deployment connectors 280*a*, 280*b* default to a closed position. In these and other cases, the fluidic port 184 of the deployment connector 168 (FIG. 7) can be configured to hold an engaged one of the fluidic ports 254 of the deployment connectors 280*a*, 280*b* in an open position. Alternatively or in addition, the fluidic ports 254 of the deployment connectors 280*a*, 280*b* and/or proximal branches of the internal fluidic channel 296 can include check valves (not shown) that allow only outgoing airflow. In a counterpart end effector that uses pneumatic power, a counterpart of the internal fluidic channel 296 can include check valves that allow only incoming airflow.

Figure 13:
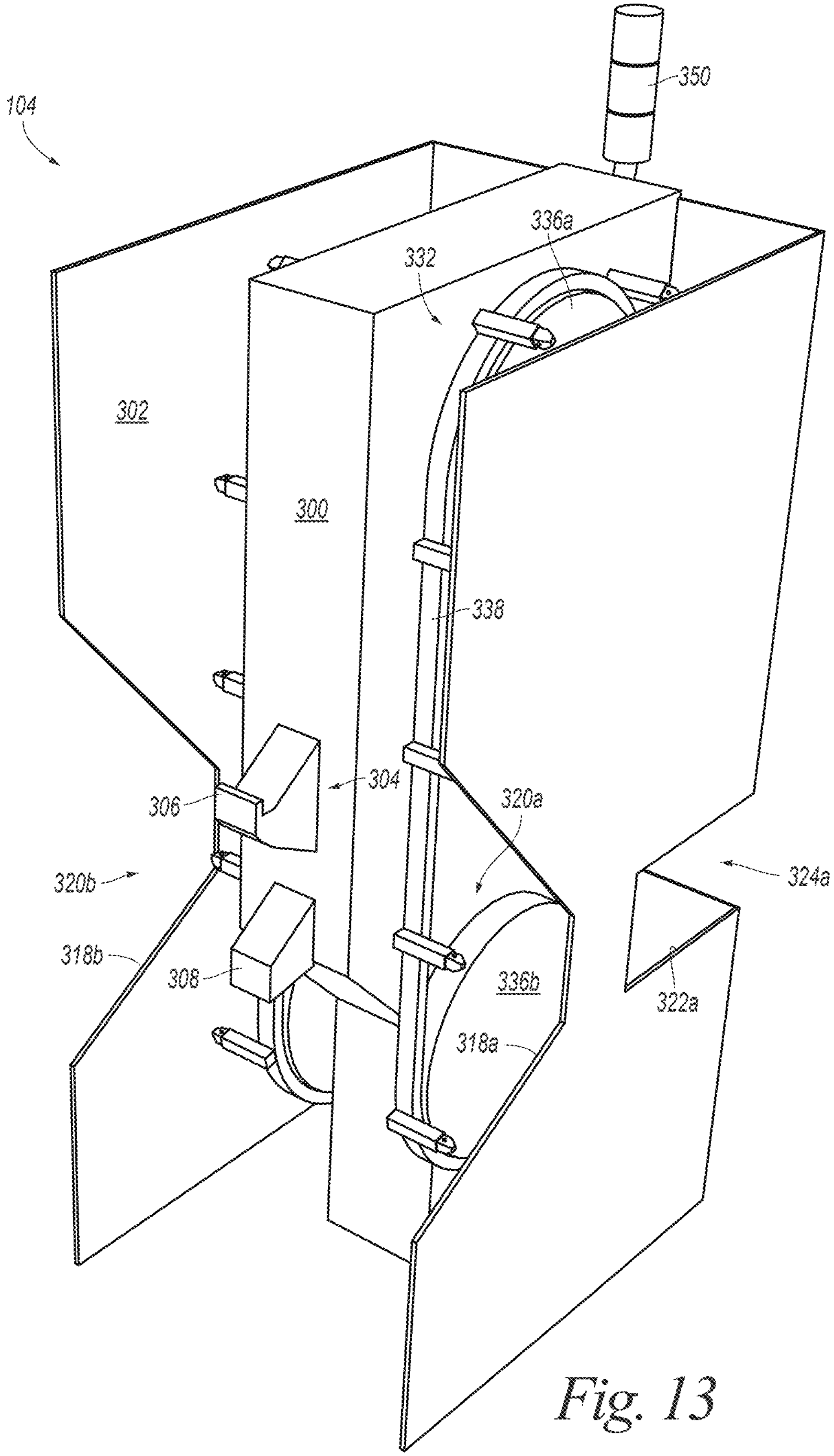
FIG. 13 is a perspective view of a station of the system of FIG. 1.
Figure 14:
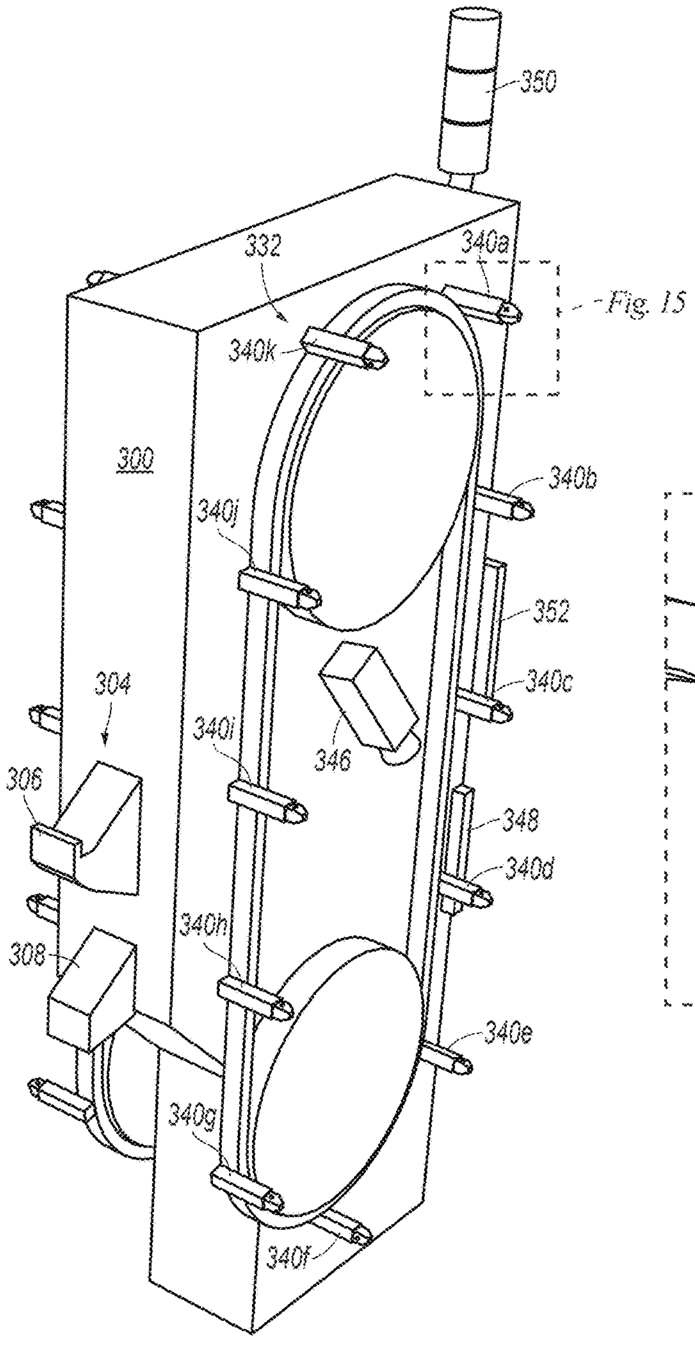
FIG. 14 is a perspective view of internal features of the station of the system of FIG. 1.
Figure 15:
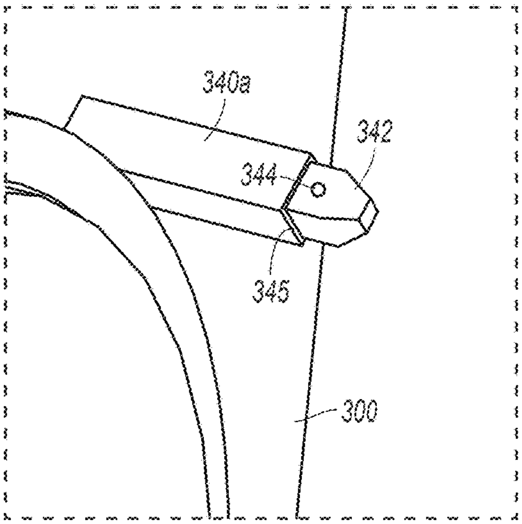
FIG. 15 is an enlarged view of a portion of FIG. 14.
Figure 16:
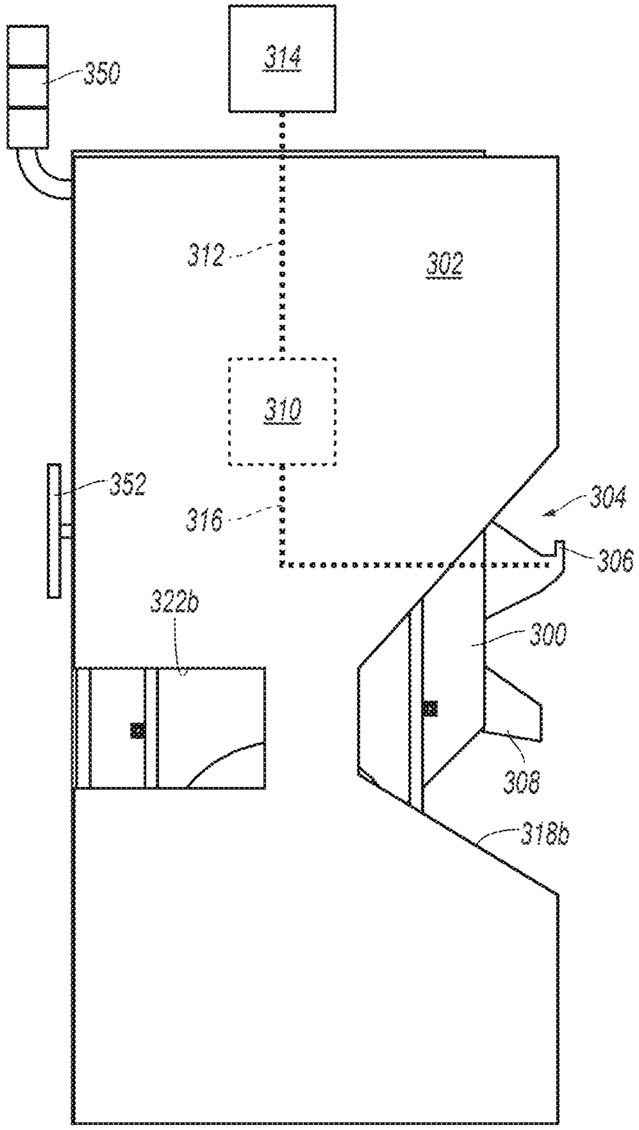
FIGS. 16-18 are, respectively, a side profile view, a rear profile view, and a top plan view of the station of the system of FIG. 1.
Figure 17:
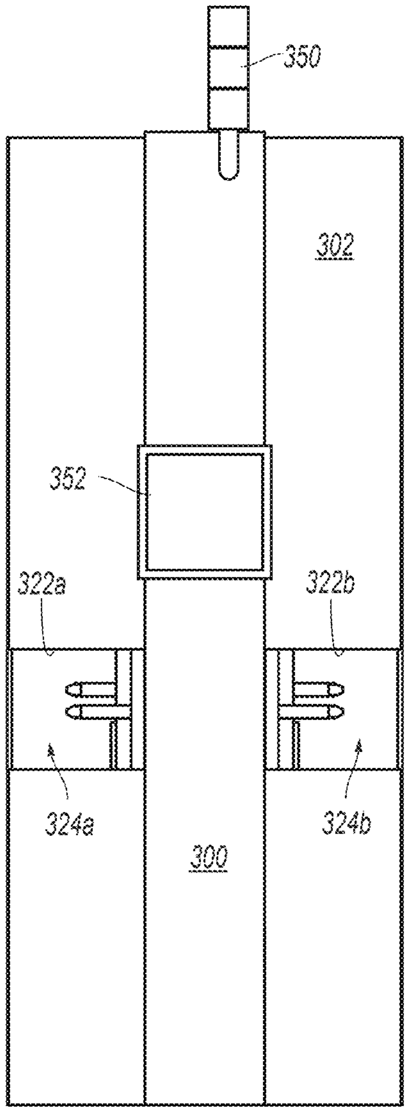
Figure 18:
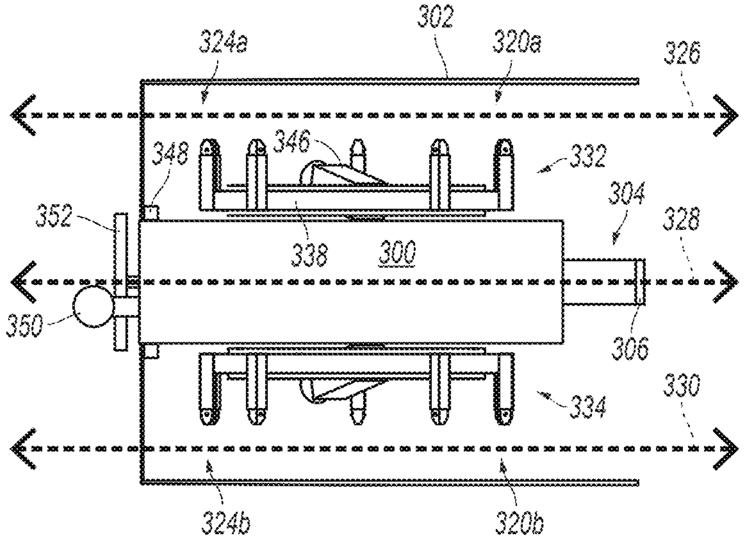

FIG. 13 is a perspective view of the station 104. FIG. 14 is a perspective view of internal features of the station 104. FIG. 15 is an enlarged view of a portion of FIG. 14. Finally, FIGS. 16-18 are, respectively, a side profile view, a rear profile view, and a top plan view of the station 104. With primary reference to FIGS. 13-18 together, the station 104 can include a pillar 300 and a housing 302 partially encasing the pillar 300. In FIG. 14, the housing 302 is omitted for purposes of illustration. The station 104 can further include a support 304 through which the station 104 is configured to carry at least a portion of a weight of the mobile robot 102 while the mobile robot 102 is in a docked state at the station 104. In at least some cases, the pillar 300 carries the support 304. In these and other cases, the station 104 can include a hook 306 at the support 304 through which the station 104 is configured to restrain anterior movement of the body 124 of the mobile robot 102 relative to the station 104 while the mobile robot 102 is in a docked state at the station 104. The posterior projection 140*a* (FIG. 4) of the mobile robot 102 can be configured to be received at the support 304 when the mobile robot 102 is in a docked state at the station 104. The station 104 can further include a stop 308 configured to contact the posterior projection 140*b* (FIG. 4) of the mobile robot 102 to further stabilize the mobile robot 102 relative to the station 104 when the mobile robot 102 is in a docked state at the station 104.

The station 104 can include a charger 310 (shown schematically in FIG. 16) through which the station 104 is configured to electrically charge the battery 194 (FIG. 7) of the mobile robot 102 while the mobile robot 102 is in a docked state at the station 104. The station 104 can include a lead 312 through which the charger 310 draws power from an external power source 314. The lead 312, for example, can be a drop from an overhead power grid. The station 104 can likewise include another lead 316 through which the charger 310 delivers power to mobile robot 102 while the mobile robot 102 is in a docked state at the station 104. As mentioned above, the support 304 can be configured to receive the posterior projection 140*a* of the mobile robot 102 when the mobile robot 102 is in a docked state at the station 104. In these and other cases, the charger 310 can be configured to electrically charge the battery 194 via the support 304 (e.g., via the hook 306) while the mobile robot 102 is in a docked state at the station 104. The station 104 can include an electrode (not shown) at the hook 306 configured to contact an electrode (also not shown) of the mobile robot 102 at the posterior projection 140*a*. In other cases, a counterpart of the station 104 can be configured to charge the mobile robot 102 in another suitable manner, such as via contact between the posterior projection 104*b* and the stop 308. In still other cases, a counterpart of the station 104 can be without charging functionality.

With reference again to the illustrated embodiment, the station 104 can include features for receiving the end effectors 106*a*-106*f* from the mobile robot 102 and dispensing the end effectors 106*a*-106*f* to the mobile robot 102, such as in the context of autonomous swapping. In at least some cases, the station 104 also includes features for receiving the end effectors 106*a*-106*f* from a human and dispensing the end effectors 106*a*-106*f* to a human, such as in the context of loading and servicing. The station 104 can include deploying ports 318 (individually identified as deploying ports 318*a*, 318*b*) and can define deploying regions 320 (individually identified as deploying regions 320*a*, 320*b*) at the deploying ports 318*a*, 318*b*, respectively. Similarly, the station 104 can include loading ports 322 (individually identified as loading ports 322*a*, 322*b*) and can define loading regions 324 (individually identified as loading regions 324*a*, 324*b*) at the loading ports 322*a*, 322*b*, respectively. The deploying ports 318*a*, 318*b* and the loading ports 322*a*, 322*b* can be local modifications of the housing 302, such as cutouts, access openings, panels, etc. In at least some cases, the deploying port 318*a* and the loading port 322*a* are separate from one another and/or the deploying port 318*b* and the loading port 322*b* are separate from one another. Furthermore, the deploying ports 318 and the loading ports 322 can be at different (e.g., opposite) respective sides of the station 104. This can be useful to facilitate access control, such as to reduce or prevent the mobile robot 102 from accessing the loading ports 322 and/or to reduce or prevent a human from accessing the deploying ports 318.

As shown in FIG. 18, the deploying region 320*a*, the pillar 300, and the deploying region 320*b* can be at a first vertical plane 326, a second vertical plane 328, and a third vertical plane 330, respectively. The first, second, and third vertical planes 326, 328, 330 can be parallel to one another with the second vertical plane 328 between the first and third vertical planes 326, 330. Relatedly, the deploying ports 318*a*, 318*b* can be separate from one another and/or the loading ports 322*a*, 322*b* can be separate from one another. In at least some cases, the station 104 is substantially bilaterally symmetrical about the second vertical plane 328. The end effectors 106*a*-106*f* can be connectable to the mobile robot 102 via one or both of the deploying ports 318*a*, 318*b*. Furthermore, the end effectors 106*a*-106*f* can be loadable to the station 104 via one or both of the loading ports 322*a*, 322*b*. The reverse of these processes can also be true. For example, the end effectors 106*a*-106*f* can be receivable from the mobile robot 102 via one or both of the deploying ports 318*a*, 318*b* and/or dispensable from the station 104 via one or both of the loading ports 322*a*, 322*b*. Thus, the deploying ports 318*a*, 318*b* can serve as deploying and receiving ports, swapping ports, etc. Similarly, the loading ports 322*a*, 322*b* can serve as loading and dispensing ports, service ports, etc.

The station 104 can include one or more mechanisms for moving end effectors between the deploying ports 318 and the loading ports 322. For example, the station 104 can include a first conveyor 332 and a second conveyor 334 through which the station 104 carries different respective subsets of the end effectors 106*a*-106*f*. The first and second conveyors 332, 334 can be spaced apart from one another, such as at opposite respective sides of the pillar 300. In at least some cases, first and second conveyors 332, 334 carry end effectors of different (e.g., opposite) respective chiralities, such as left-handed end effectors at the first conveyor 332 and right-handed end effectors 334 at the second conveyor 334. In addition or alternatively, the station 104 can carry end effectors compatible with different respective arms of a mobile robot (e.g., the arm 142*b* or the arm 142*a*) via the first and second conveyors 332, 334, respectively. The first conveyor 332 can define a first conveyor length (not labeled) and be configured to move a given one of the end effectors 106*a*-106*f* along a path extending through the deploying region 320*a* and through the loading region 324*a*. Similarly, the second conveyor 334 can define a second conveyor length (not labeled) and be configured to move a given one of the end effectors 106*a*-106*f* along a path extending through the deploying region 320*b* and through the loading region 324*b*. In the illustrated case, the first and second conveyors 332, 334 are substantially independent from one another. In other cases, a counterpart of the station 104 can include a single conveyor that moves through loading and deploying regions corresponding to all of the loading and deploying regions 324, 320 together. In still other cases, a counterpart of one or both of the first and second conveyors 332, 334 can include a chain magazine, a cartesian retrieval system (e.g., having an end effector storage array and a retrieval arm), a carousel, or another suitable system.

With reference again to the illustrated embodiment, additional features of the first conveyor 332 are described below. It should be understood that the second conveyor 334 can include the same or similar features mirrored about the second vertical plane 328. The first conveyor 332 can include pulleys 336 (individually identified as pulleys 336*a*, 336*b*) vertically spaced apart from one another at one side of the pillar 300. The first conveyor 332 can further include a belt 338 looped around the pulleys 336 along a first conveyor path (not labeled). The station 104 can include a motor (not shown) configured to rotate the belt 338 along the first conveyor path by actuating one or both of the pulleys 336*a*, 336*b*. In at least some cases, the first conveyor path is stadium shaped. The first conveyor 332 can further include attachment arms 340 (individually identified as attachment arms 340*a*-340*k*) spaced apart from one another and carried by the belt 338. The station 104 can include storage connectors 342 (one labeled) distally carried by the respective attachment arms 340*a*-340*k*. The storage connectors 342 can be compatible with the storage connectors 262, 284 of the end effectors 106*a*-106*f*. Thus, the station 104 can be configured to carry the end effectors 106*a*-106*f* via respective couplings of one of the storage connectors 342 and one of the storage connectors 262, 284. In at least some cases, a given one of the storage connectors 342 is configured to be connected to any of the storage connectors 262, 284. Likewise, a given one of the storage connectors 262, 284 can be configured to be connected to any of the storage connectors 342.

A coupled pair of a given one of the storage connectors 342 and a given one of the storage connectors 262, 284 can include a spring clasp through which a corresponding one of the end effectors 106*a*-106*f* is releasably secured to the first conveyor 332. As shown in FIG. 15, the storage connectors 342 can include respective protrusions 344 configured to resiliently retract as one of the storage connectors 262, 284 is moved into engagement with the storage connector 342 and then spring out into one of the indentations 290 of the storage connector 262, 284 when the storage connector 342 and the storage connector 262, 342 are fully connected. Interaction between one of the protrusions 344 a portion of one of the storage connectors 262, 284 around a corresponding one of the indentations 290 can provide enough resistance to hold the corresponding one of the end effectors 106*a*-106*f* in place until it is affirmatively removed from the first conveyor 332 with more than a threshold level of force. The threshold level of force can be more than the force typically experienced by the end effectors 106*a*-106*f* during movement within station 104 not associated with deployment. In at least some cases, the respective transverse cross-sectional shapes of the storage connectors 342 and the storage connectors 262, 342 are polygonal to promote alignment of a given one of the end effectors 106*a*-106*f* and a given one of the attachment arms 340*a*-340*k* during loading, unloading, deploying, dispensing, etc. Furthermore, the attachment arms 340*a*-340*k* can include a lip 345 that promotes a desired depth of mating engagement between a given one of the storage connectors 342 and a given one of the storage connectors 262, 342.

The station 104 can further include a vision sensor 346 configured to capture vision data on the loading region 324*a*. In addition or alternatively, the station 104 can include a sensor 348 operably associated with the loading port 322*a*. In at least some cases, the vision sensor 346 is a camera. In these and other cases, the sensor 348 can be a curtain generator. The controller 107 can be configured to control operation of the station 104 based on information from the vision sensor 346 and/or the sensor 348. For example, the controller 107 can be configured to identify an end effector 106*a*-106*f* at the loading region 324*a* based on information from the vision sensor 346 and to update an inventory of the station 104 based on the identification. As another example, the controller 107 can be configured to inhibit mechanical motion at the loading region 324*a* at least partially in response to detecting a breach of the loading port 322*a* via the sensor 348. This can be useful to reduce or prevent hand injuries even if the loading port 322*a* does not include a physical barrier. The station 104 can further include a light stack 350 or other status indicator through which the station 104 provides information (e.g. status information) to human and/or robot users of the station 104. The station 104 can still further include a touchscreen 352 or other user interface device through which the station 104 communicates with human and/or robot users of the station 104.

Figure 19:
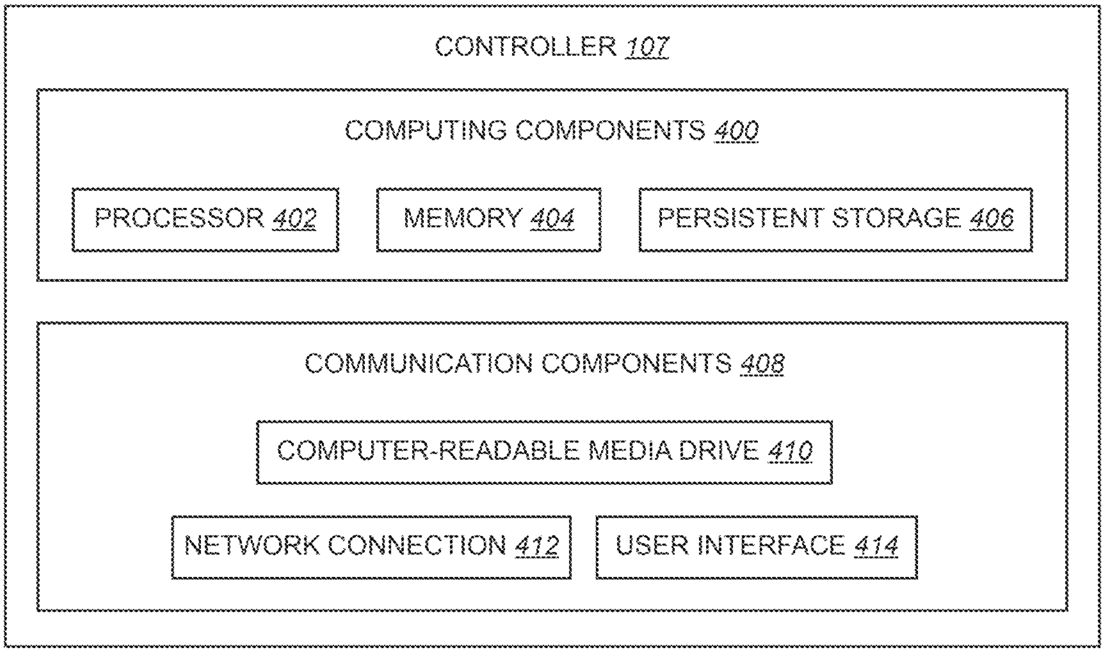
FIG. 19 is a block diagram depicting a controller of the system of FIG. 1.

FIG. 19 is a block diagram depicting the controller 107. When suitable, operations described elsewhere in this disclosure (e.g., data operations, movements of the mobile robot 102, other operations of the mobile robot 102, etc.) can be implemented at least partially via the controller 107. As shown in FIG. 19, the controller 107 can include computing components 400. The computing components 400 can include a processor 402, such as one or more general-purpose or special-purpose integrated circuits including digital logic gates for executing programs or for otherwise processing data. The computing components 400 can further include memory 404, such as one or more integrated circuits for storing data in use. The memory 404 can include a multithreaded program, an operating system including a kernel, device drivers, etc. The computing components 400 can further include persistent storage 406, such as a hard drive for persistently storing data. Examples of data that can be stored by the persistent storage 406 include control-model data, diagnostic data, sensor data, configuration data, environmental data, and current-state data. The computing components 400 can collectively define a computer configured to manage, control, receive information from, deliver information to, and/or otherwise usefully interact with other components of the controller 107 and of the system 100.

The controller 107 can further include communication components 408. The communication components 408 can include a computer-readable media drive 410 for reading computer programs and/or other data stored on computer-readable media. As one example, the computer-readable media drive 410 can be a flash-memory drive. The communication components 408 can further include a network connection 412 for connecting other components of the controller 107 and of the system 100 to one another and to other devices and systems, such as other mobile robots, other stations, facility management systems, fleet management systems, etc. The network connection 412 can be wired or wireless and can be via the Internet, a Local Area Network (LAN), a Wide Area Network (WAN), BLUETOOTH®, Wi-Fi®, a cellular-phone network, etc. The network connection 412 can include networking hardware, such as routers, switches, transmitters, receivers, computer-readable transmission media, etc. The communication components 408 can further include a user interface 414 including hardware, such as a touchscreen, a keyboard, a mouse, a display, and/or other suitable devices for communicating with a user. The system 100 can use the communication components 408 for internal and/or external operations. Examples of these operations include interacting with subsystems that provide contextual information about the environment in which the mobile robot 102, the station 104, and the end effectors **106*a*-160*f* operate and interacting with subsystems for changing operating conditions of the mobile robot 102, the station 104, and the end effectors 106*a*-106*f***.

Figure 20:
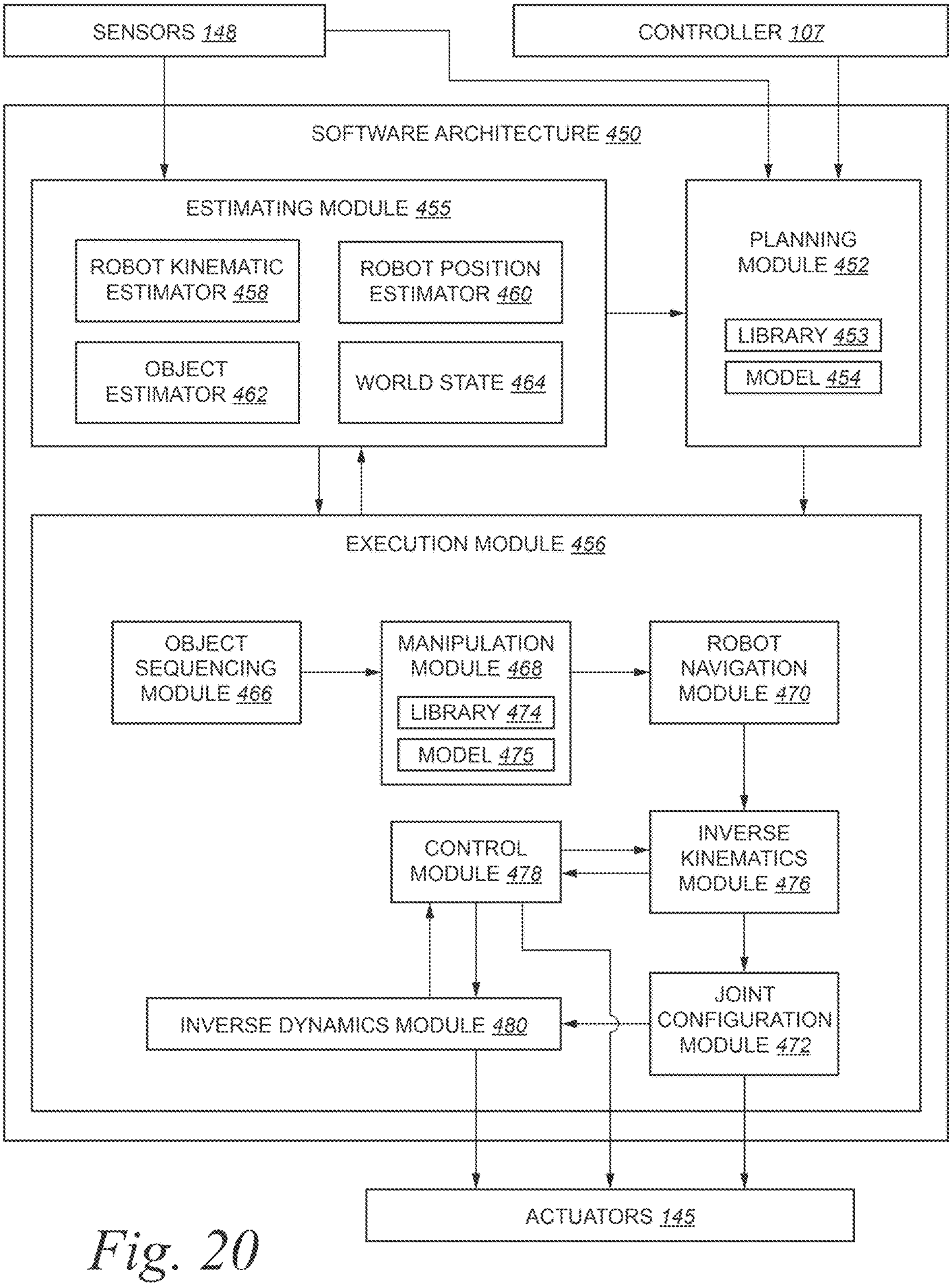
FIG. 20 is a block diagram depicting software architecture of the controller of the system of FIG. 1 and associated subcomponents of the system.

FIG. 20 is a block diagram depicting software architecture 450 and associated portions of the controller 107. The software architecture 450 can be within the memory 404 or otherwise operably associated with any or all of the various components of the controller 107 as described above. With primary reference to FIGS. 19 and 20 together, the software architecture 450 can include a planning module 452, an estimating module 455, and an execution module 456 operably associated with one other. The planning module 452 can be configured to relay or to generate a plan corresponding to an objective for the mobile robot 102 (e.g., unload all objects on a shelf, retrieve an object from a first location and move the object to a second location, etc.). In at least some cases, the planning module 452 receives information from the communication components 408 and relays or generates a plan based at least partially on the received information. For example, the planning module 452 may receive a command from a user via the communication components 408 and relay the command as a plan. As another example, the planning module 452 may receive a command from a user via the communication components 408 and generate a plan related to the command. As yet another example, the planning module 452 may generate a plan without receiving a command from a user, such as at a predetermined time and/or in response to information about a current state of the mobile robot 102 or the environment received via the sensors 148. As shown in FIG. 20, the planning module 452 can include a library 453 including plans and/or strategies and a model 454 operably associated with the library 453. The model 454 can be configured to select plans and/or strategies from the library 453 based on input information. In at least some cases, the model 454 is generated by a machine-learning algorithm (e.g., a reinforcement-learning algorithm) trained on real and/or simulated contextual information.

The estimating module 455 can receive information from the sensors 148 and generate estimates in real time or in near real time to inform generating or executing a plan. The estimating module 455 can include a robot kinematic estimator 458, a robot position estimator 460, an object estimator 462, and a world state 464. The robot kinematic estimator 458 can generate an estimate of a current kinematic state of the mobile robot 102 (e.g., balanced, off-balance, walking, standing, etc.) and estimates of positions of individual joints of the mobile robot 102. The robot position estimator 460 can generate a current estimate of a position of the mobile robot 102 within an environment. This position can be a set of coordinates and can be based on perception information, GPS information, and/or other information received by or generated by the mobile robot 102. Perception information potentially relevant to the position of the mobile robot 102 includes, among other examples, information corresponding to distances between the mobile robot 102 and landmarks in an environment and information corresponding to fiducial markings (e.g., AprilTags) carried by or otherwise associated with the landmarks. This information can be detected, for example, via a three-dimensional sensor of the mobile robot 102 and/or via a camera of the mobile robot 102. Furthermore, information can move between components of the estimating module 455. For example, the world state 464 can receive information from the robot kinematic estimator 458, the robot position estimator 460, and the object estimator 462. In addition or alternatively, the object estimator 462 can receive information from the robot kinematic estimator 458 and the robot position estimator 460.

The object estimator 462 can generate a current estimate of an object (e.g., the station 104) within an environment. In at least some cases, the estimate is a pose or other reference corresponding to a position and orientation of the object. As with the position of the mobile robot 102, the position of an object can be a set of coordinates and can be based on perception information, GPS information, and/or other information received by or generated by the mobile robot 102. Perception information potentially relevant to the position of an object includes, among other examples, information corresponding to distances between the object and the mobile robot 102, distances between the object and landmarks in an environment, and information corresponding to fiducial markings (e.g., AprilTags) carried by or otherwise associated with the object. This information can be detected, for example, via a three-dimensional sensor of the mobile robot 102 and/or via a camera of the mobile robot 102. In at least some cases, the object estimator 462 uses information (e.g., sensor poses) from the robot kinematic estimator 458 and/or the robot position estimator 460 to inform generation of object estimates. This can be useful, for example, when a fiducial or other landmark in an environment is not visible. In at least some cases, the object estimator 462 is configured to update the world state 464 with object references and/or other information related to objects in an environment in which the mobile robot 102 operates. Furthermore, the object estimate can include an identification of an object and properties (e.g., dimensions) associated with that identification. For example, the object estimator 462 can include a machine-learning model (e.g., Detectron2 (Facebook AI Research) with Mask R-CNN implementation) that receives perception information (e.g., an image) corresponding to an object and outputs an object identification based at least partially on the perception information. The object estimator 462 can further include a lookup table for generating object properties based at least partially on this object identification.

The execution module 456 can be configured to receive a plan from the planning module 452 and estimates from the estimating module 455. The execution module 456 can include a manipulation module 468, a robot navigation module 470, and a joint configuration module 472. The planning module 452 can be configured to send a plan to the manipulation module 468, to the robot navigation module 470, or to the joint configuration module 472 based on attributes of the plan. For example, when a plan includes explicit instructions for positions of joints of the mobile robot 102, the planning module 452 can send the plan to the execution module 456 via the joint configuration module 472. As another example, when a plan does not involve interacting with an object, the planning module 452 can send the plan to the execution module 456 via the robot navigation module 470. As yet another example, when a plan concerns only one object and the object is remote to the mobile robot 102, the planning module 452 can send the plan to the execution module 456 via the manipulation module 468. As a final example, when a plan concerns multiple objects remote to the mobile robot 102, the planning module 452 can send the plan to the execution module 456 via the object sequencing module 466.

The manipulation module 468 can include a library 474 including manipulation primitives and/or sequences of manipulation primitives that can be used to manipulate an object. The manipulation module 468 can select manipulation primitives and/or sequences for a given object based on contextual information, such as information about the object and/or information about the environment. In addition or alternatively, the manipulation module 468 can include a model 475 that outputs manipulation estimates based on contextual information. The model 475 can be a machine-learning model generated by a machine-learning algorithm (e.g., a reinforcement-learning algorithm) trained on real and/or simulated contextual information. The robot navigation module 470 can generate targets for different parts of the mobile robot 102 further to a manipulation or other portions of a plan being executed. Examples of targets include positions of the feet 146*a*, 146*b* in the environment, positions of the distal end portions 156 of the arms 142*a*, 142*b* in the environment, etc. The robot navigation module 470 can update these targets continuously or near continuously based on information from the estimating module 455. The execution module 456 can further include an inverse kinematics module 476 that translates the targets from the robot navigation module 470 into joint configurations throughout the mobile robot 102.

The execution module 456 can also include a control module 478 that receives joint configurations from the inverse kinematics module 476 and generates joint parameters (e.g., positions, velocities, accelerations, etc.) to be executed by the mobile robot 102 via the actuators 145 to achieve these joint configurations. Through continuous or near-continuous communication with the inverse kinematics module 476, the control module 478 can modify the joint parameters to at least partially compensate for deviations as the mobile robot 102 executes the joint configurations. The inverse kinematics module 476 can send other joint configurations not subject to active control to the joint configuration module 472 directly. Similar to the control module 478, the joint configuration module 472 can generate joint parameters (e.g., positions, velocities, accelerations, etc.) to be executed by the mobile robot 102 to achieve joint configurations received from the inverse kinematics module 476 or from the planning module 452.

Finally, the execution module 456 can include an inverse dynamics module 480 that receives joint parameters from the control module 478 and from the joint configuration module 472. The inverse dynamics module 480 can track a desired wrench of the mobile robot 102 and its relationship with objects in the environment. In at least some cases, the inverse dynamics module 480 references a map of robot positions and wrenches to joint torques. Based at least partially on tracking these joint torques, the inverse dynamics module 480 can modify joint parameters to achieve a desired result. For example, the inverse dynamics module 480 may modify joint parameters from the control module 478 and from the joint configuration module 472 to maintain contact between the distal end portion 156 of the arms 142*a* and a given one of the end effectors 106*a*-106*f* carried by the station 104 as the mobile robot 102 retrieves the given one of the end effectors 106*a*-106*f* from the station 104. The inverse dynamics module 480 can then send modified joint parameters to the actuators 145 for execution. For configurations that do not involve dynamic interaction with the environment, the control module 478 and the joint configuration module 472 can send joint parameters directly to the electromechanical actuators 145 for execution.

Suitable software components disclosed herein can be part of a distributed system or component thereof or implemented as one or more network-based services. For example, a compute cluster within a computing service may present computing or storage services or other types of services that employ any distributed computing systems described herein to clients as network-based services. In some embodiments, a network-based service may be implemented by a software or hardware system designed to support interoperable machine-to-machine interaction over a network. A network-based service may have a gateway described in a machine-processable format. Other systems may interact with the network-based service in a manner prescribed by the description of the network-based service's gateway. For example, the network-based service may define various operations that other systems may invoke, and may define a particular application programming interface (API) to which other systems may be expected to conform when requesting the various operations. An API refers to an interface or other communication protocol between a client and a server, such that if the client makes a request in a predefined format, the client should receive a response in a specific format or initiate a defined action. In the cloud provider network context, APIs may provide a gateway for customers to access cloud infrastructure by allowing customers to obtain data from and/or to cause actions within the cloud provider network, enabling the development of applications that interact with resources and services hosted in the cloud provider network. APIs can also enable different services of the cloud provider network to exchange data with one another.

In a distributed system, some or all of the software architecture 450 and other software described herein can be executed remotely from the mobile robot 102, the station 104, and the end effectors 106. For example, the mobile robot 102 can be configured to collect raw sensor data via the sensors 148 and to transmit some or all of this raw sensor data to a remote server in real time or near real time for processing. The mobile robot 102 can then receive joint commands and/or other products of this processing via communication with the server. In these and other cases, computing operations can be allocated among local and remote computing systems depending on factors such as computing demand, available computing resources, time sensitivity of computing products, etc. Moreover, even counterparts of the sensors 148 can be remote from the mobile robot 102 in certain cases. For example, a remote sensor may track its reference frame relative to a local sensor of the mobile robot 102 and may communicate that reference frame with sensor data it collects at any given time. A server receiving the sensor data can then use the relationship between the reference frame of the local sensor and the reference frame of the remote sensor to generate output in a reference frame compatible with processes that rely on sensor data from the local sensor only. Alternatively, in a non-distributed system, all information processing and command execution can occur locally at the mobile robot 102, the station 104, or other local hardware depending on the implementation.

Components of the controller 107 can be connected to one another and/or to other components of the system 100 via suitable conductors, transmitters, receivers, circuitry, etc. While the controller 107 configured as described may be used to support operation of the mobile robot 102, the station 104, and the end effectors 106*a*-160*f*, it should be appreciated that the mobile robot 102, the station 104, and the end effectors 106*a*-106*f* may be operated using devices of various types and configurations and that such devices may have various components and levels of responsibility. For example, the mobile robot 102 may employ individual computer systems and/or controllers to manage discrete aspects of its operations, such as an individual computer system or controller to perform computer vision operations, a separate computer system or controller to perform power management, etc. In some cases, the mobile robot 102, the station 104, and/or the end effectors 106*a*-106*f* employ the system 100 to control physical functions according to one or more designated rules encoded in software. For example, these rules can include minimums and/or maximums, such as a maximum degree of rotation for a joint, a maximum speed at which a component is allowed to move, a maximum acceleration rate for one or more components, etc. The controller 107 may include any number of mechanical aspects and associated rules, which may be based on or otherwise configured in accordance with the purpose of and/or functions performed by the mobile robot 102, the station 104, or the end effectors 106.

Software features of the system 100 and other computer systems described herein may take the form of computer-executable instructions, such as program modules executable by the computing components 400. Generally, program modules include routines, programs, objects, components, data structures, or the like configured to perform particular tasks based on source data, which may be encrypted. Control scripts may be implemented via a suitable language, such as C/C++ or Python®. The functionality of the program modules may be combined or distributed in various embodiments, including in cloud-based implementations. Furthermore, certain aspects of the present technology can be embodied in special purpose computers or data processors, such as in application-specific integrated circuits (ASIC), digital signal processors (DSP), field-programmable gate arrays (FPGA), graphics processing units (GPU), many core processors, etc. specifically programmed, configured, or constructed to perform one or more computer-executable instructions. While aspects of the present technology, such as certain functions, may be described as being performed on a single device, these aspects, when suitable, can also be practiced in distributed computing environments where functions or modules are shared among different processing devices linked through a communications network such as a LAN, a WAN, or the Internet. In a distributed computing environment, program modules and other components may be located in both local and remote memory storage and in other devices, which may be in communication via one or more wired or wireless communication channels.

Aspects of the present technology may be stored or distributed on tangible computer-readable media, which can include volatile or non-volatile storage components, such as magnetically or optically readable computer media, hardwired or preprogrammed chips (e.g., electrically erasable programmable read-only memory semiconductor chips), nanotechnology memory, or other computer-readable storage media. Alternatively, computer-implemented instructions, data structures, screen displays, and other data under aspects of the present technology may be distributed (encrypted or otherwise) over the Internet or over other networks (including wireless networks) on a propagated signal on a propagation medium (e.g., electromagnetic wave(s), sound wave(s), etc.) over a period of time. Furthermore, such data may be provided on an analog or a digital network and packet switched, circuit switched, or managed under another suitable scheme. The term computer-readable storage medium as used herein does not, however, encompass signals themselves (e.g., propagating signals) or transitory media. One of ordinary skill in the art will recognize that various components of the mobile robot 102, the station 104, the end effectors 106*a*-106*f* and other devices and systems described herein may communicate via any number of wired or wireless communication techniques and that elements of such devices and systems may be distributed rather than located in a single monolithic entity. Finally, electrical and computing aspects of systems in accordance with various embodiments of the present technology may operate in environments or according to processes other than the examples of environments and processes described herein.

Examples of Methods

Figure 21:
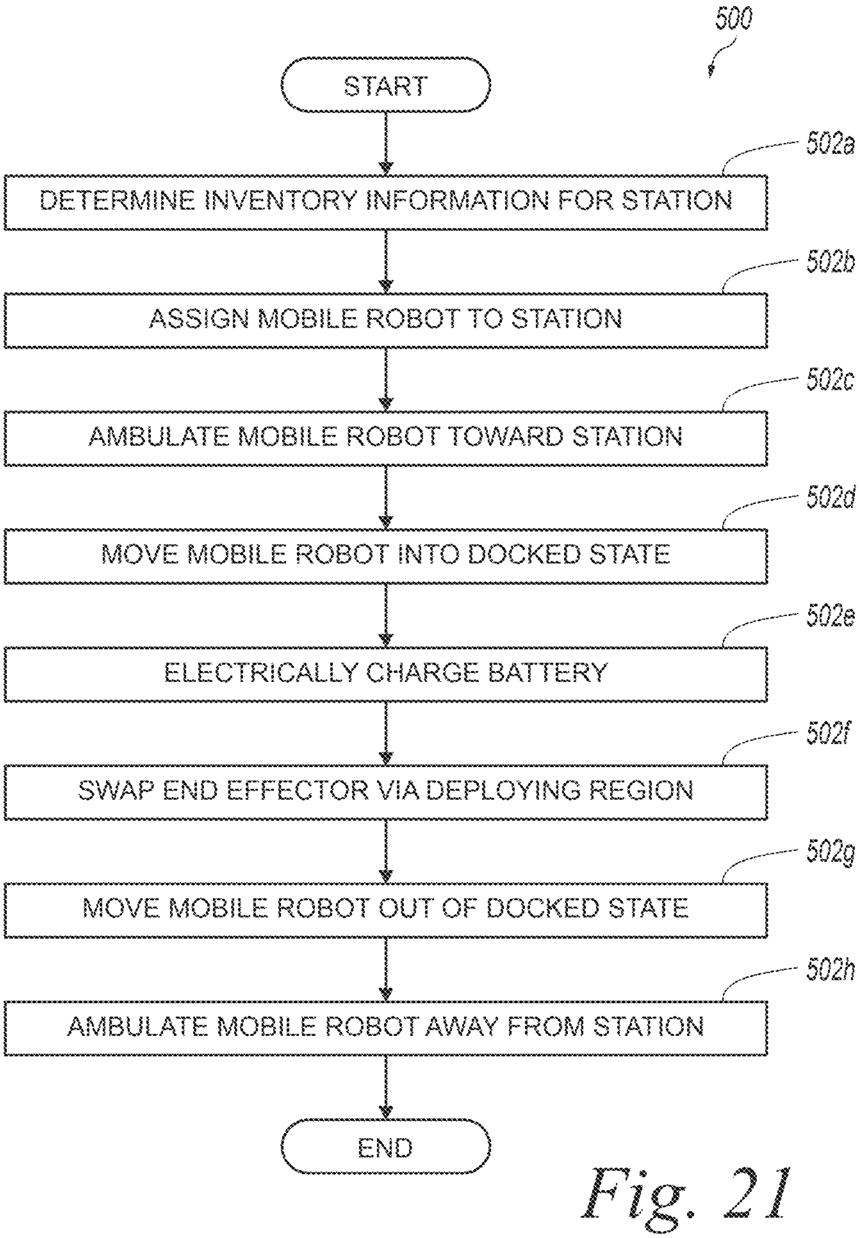
FIG. 21 is a block diagram corresponding to a method in accordance with at least some embodiments of the present technology.
Figure 22:
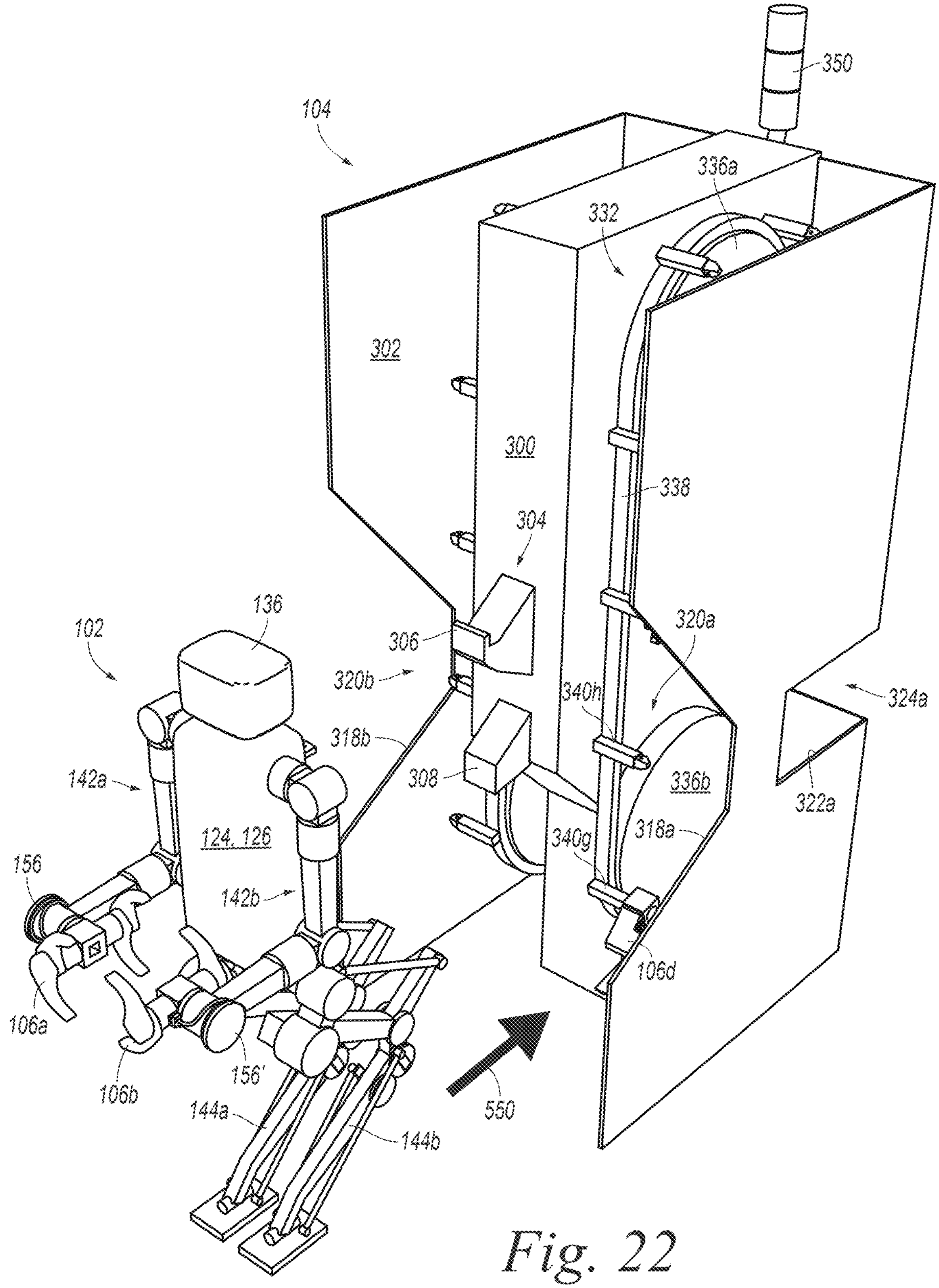
FIGS. 22-29 are perspective views of the mobile robot, the station, and selected end effectors of the system of FIG. 1 at different respective times during an example of the method of FIG. 21.

FIG. 21 is a block diagram corresponding to a method 500 in accordance with at least some embodiments of the present technology. The diagram includes blocks 502*a*-502*h* corresponding to different respective portions of the method 500. FIGS. 22-29 are perspective views of the mobile robot 102, the station 104, and selected end effectors 106*a*-106*f* of the system 100 at different respective times during an example of the method 500. Examples of the method 500 will be described in the context shown in FIGS. 22-29 for purposes of illustration. It should be understood, however, that these examples can alternatively be practiced in other contexts. As shown in FIG. 22, the mobile robot 102 can be equipped with the end effectors 106*a*, 106*b* via the arms 142*a*, 142*b*, respectively. The station 104 can carry the end effector 106*d* at the attachment arm 340g. The method 500 can include determining inventory information for the station 104 (block 502*a*). In at least some cases, this is in response to a need for an end effector change. For example, the controller 107 may determine that the mobile robot 102 should swap the end effector 106*b* for the end effector 106*d*. The controller 107 can then determine that the end effector 106*d* is available at the station 104 based on the inventory information for the station 104. Furthermore, the inventory information for the station 104 may include an indication that the end effector 106*d* is at the first conveyor 332. The controller 107 can further determine that the first conveyor 332 is compatible with the arm 142*b*. The method 500 can then include assigning the mobile robot 102 to the station 104 (block 502*b*). This can be based at least partially on the inventory information for the station 104, such as the indication that the end effector 106*d* is available.

Figure 23:
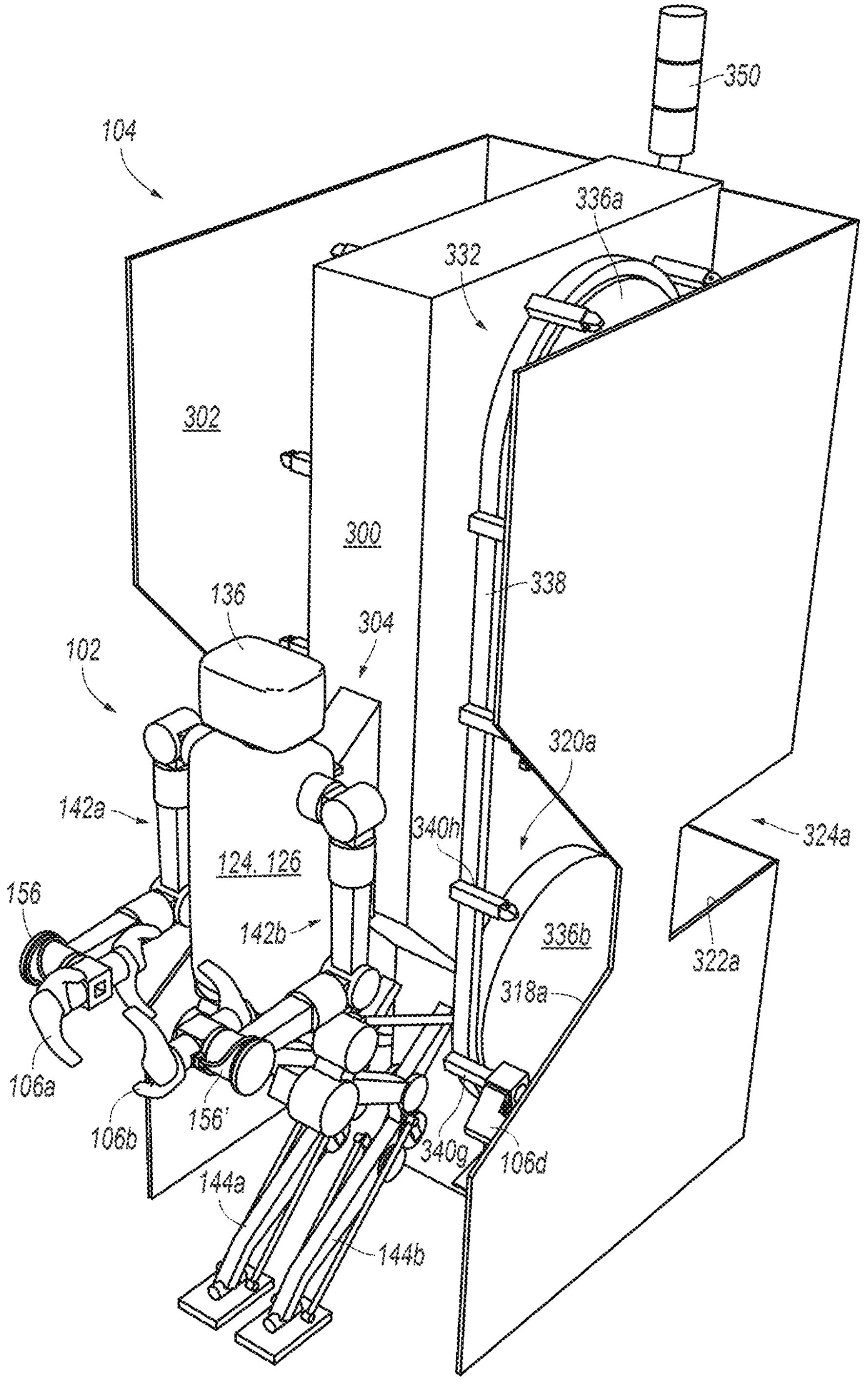

The method 500 can further include ambulating the mobile robot 102 toward the station 104 (block 502*c*) via the legs 144*a*, 144*b*. This can be at least partially in response to assigning the mobile robot 102 to the station 104. As shown in FIGS. 22 and 23, ambulating the mobile robot 102 can include ambulating the mobile robot 102 rearwardly in the direction of arrow 550. After the mobile robot 102 reaches the station 104, the method 500 can include moving the mobile robot 102 into a docked state at the station 104 (block 502*d*). In at least some cases, this includes transferring weight of the mobile robot 102 from at least one of the legs 144*a*, 144*b* to the station 104, such as via contact between the mobile robot 102 and the support 304. In at least some cases, transferring weight to the station 104 is via the posterior projection 140*a*. After transferring weight to the station 104, the method 500 can include electrically charging the battery 194 via the station 104 (block 502*e*). Also after transferring weight to the station 104, the method 500 can include restraining anterior movement of the mobile robot 102 relative to the station 104, such as via the hook 306. The method 500 can further include swapping the end effector 106*b* via the station 104 (block 502*f*), such as via the deploying port 318*a* and via the deploying region 320*a*. Operations described in the context of this swapping can be independent operations of the method 500. The overall swapping and/or constituent operations can occur while the mobile robot 102 is in a docked state at the station 104. Alternatively or in addition, the overall swapping and/or constituent operations can occur while the mobile robot 102 is undocked. For example, rather than approaching the station 104 posteriorly and reaching into the station 104 posteriorly from a docked state, the mobile robot 102 can approach the station anteriorly and reach into the station 104 anteriorly from an undocked state. In this example, other aspects of the method 500 can be the same or similar to aspects described for the illustrated example. Additional details of this approach are described below with reference to FIG. 34.

Figure 24:
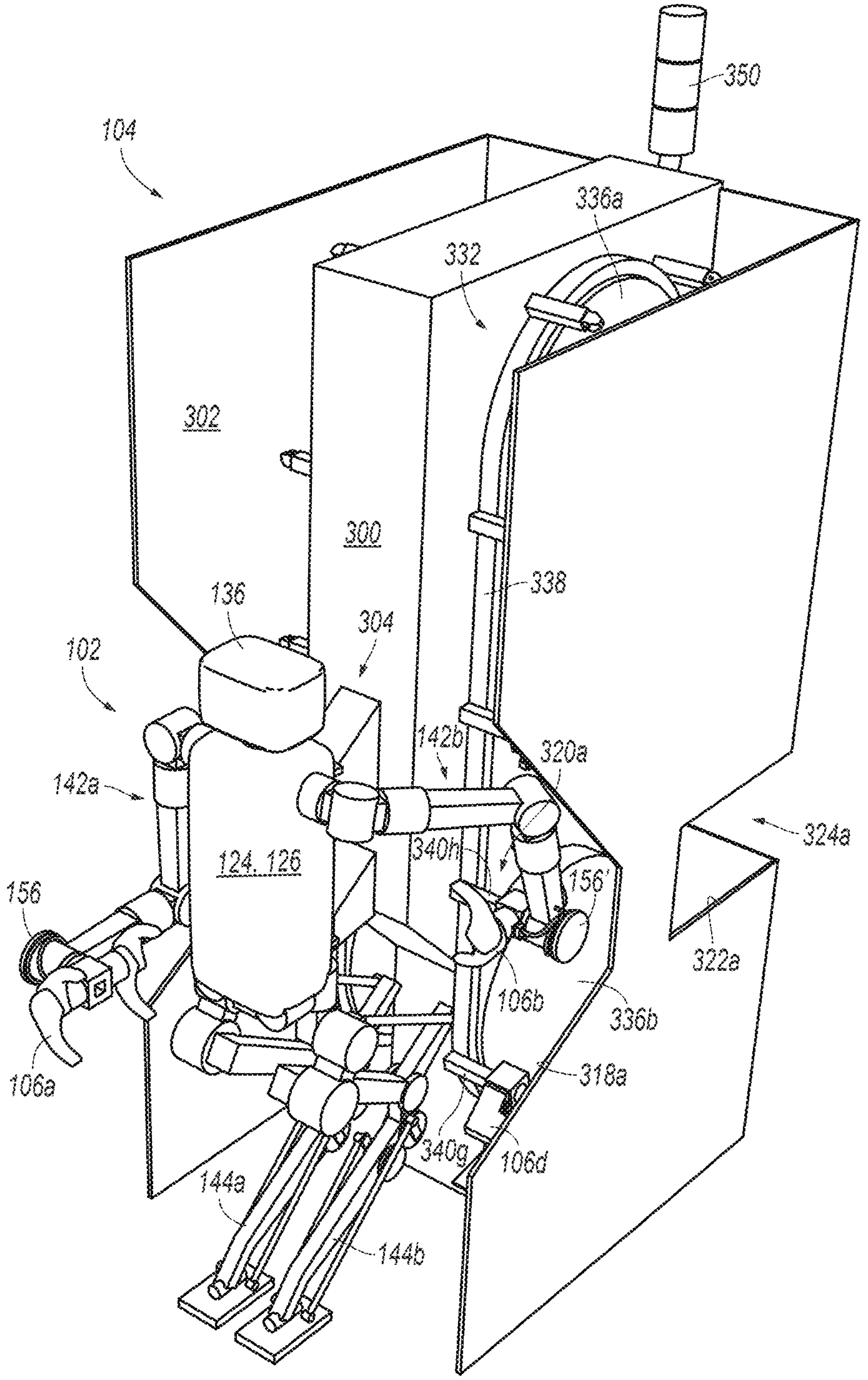

With reference again to the illustrated example, swapping the end effector 106*b* can include stowing the end effector 106*b* at the deploying region 320*a*. As shown in FIG. 24, this can include moving the distal end portion 156 of the arm 142*b* posteriorly toward the first conveyor 332. The method 500 can then include stowing the end effector 106*b* on the first conveyor 332. The stowing can include connecting the storage connector 262 of the end effector 106*b* and the storage connector 342 of the station 104 at the attachment arm 340*h*. In some cases the station 104 registers the mobile robot 102 in a consistent position. The mobile robot 102 can use this position as a reference frame for aligning the storage connectors 262, 342. In addition or alternatively, the mobile robot 102 can register its position relative to the station 104 via the sensors 148. For example, the station 104 can include an AprilTag or other fiducial (not shown) that the mobile robot 102 can detect via a camera among the sensors 148. Furthermore, the mobile robot 102 may use feedback from a camera among the sensors 148 to guide movement of the distal end portion 156 of the arm 142*b* toward the attachment arm 340*h*. In these and other cases, a suitable camera among the sensors 148 can be posteriorly directed from the torso 126, laterally directed from the arm 142*b*, or have another suitable configuration.

Figure 25:
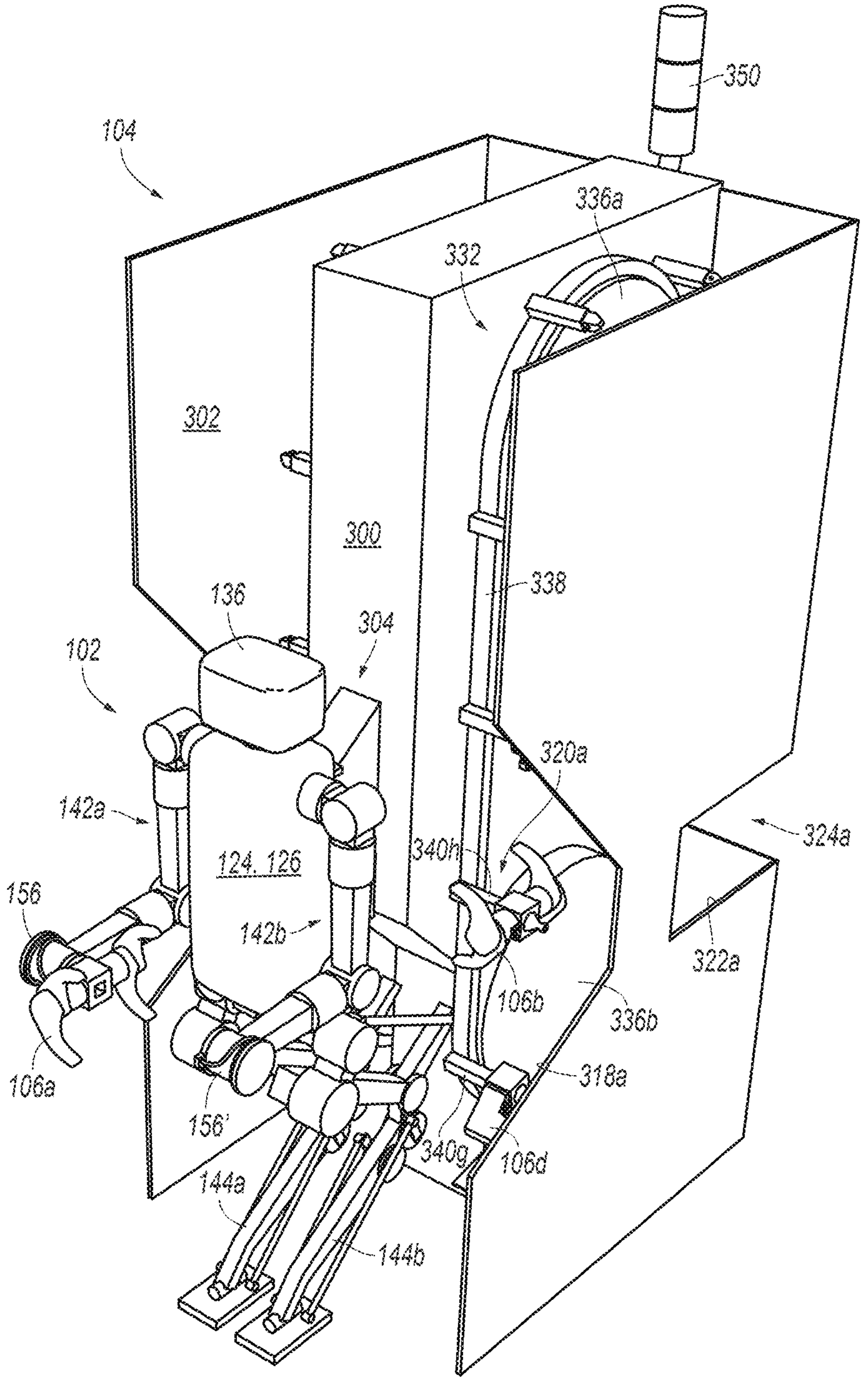
Figure 26:
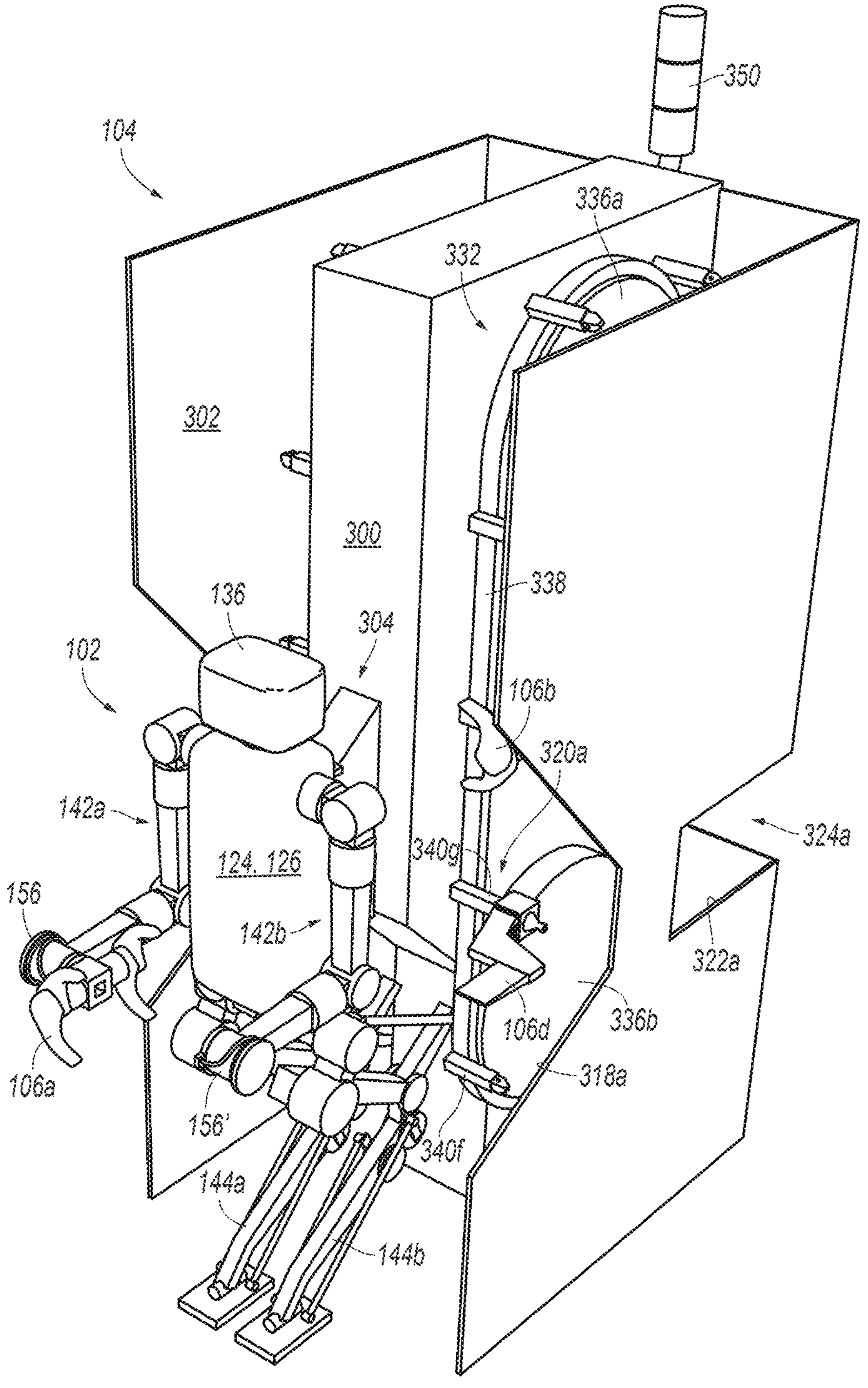
Figure 27:
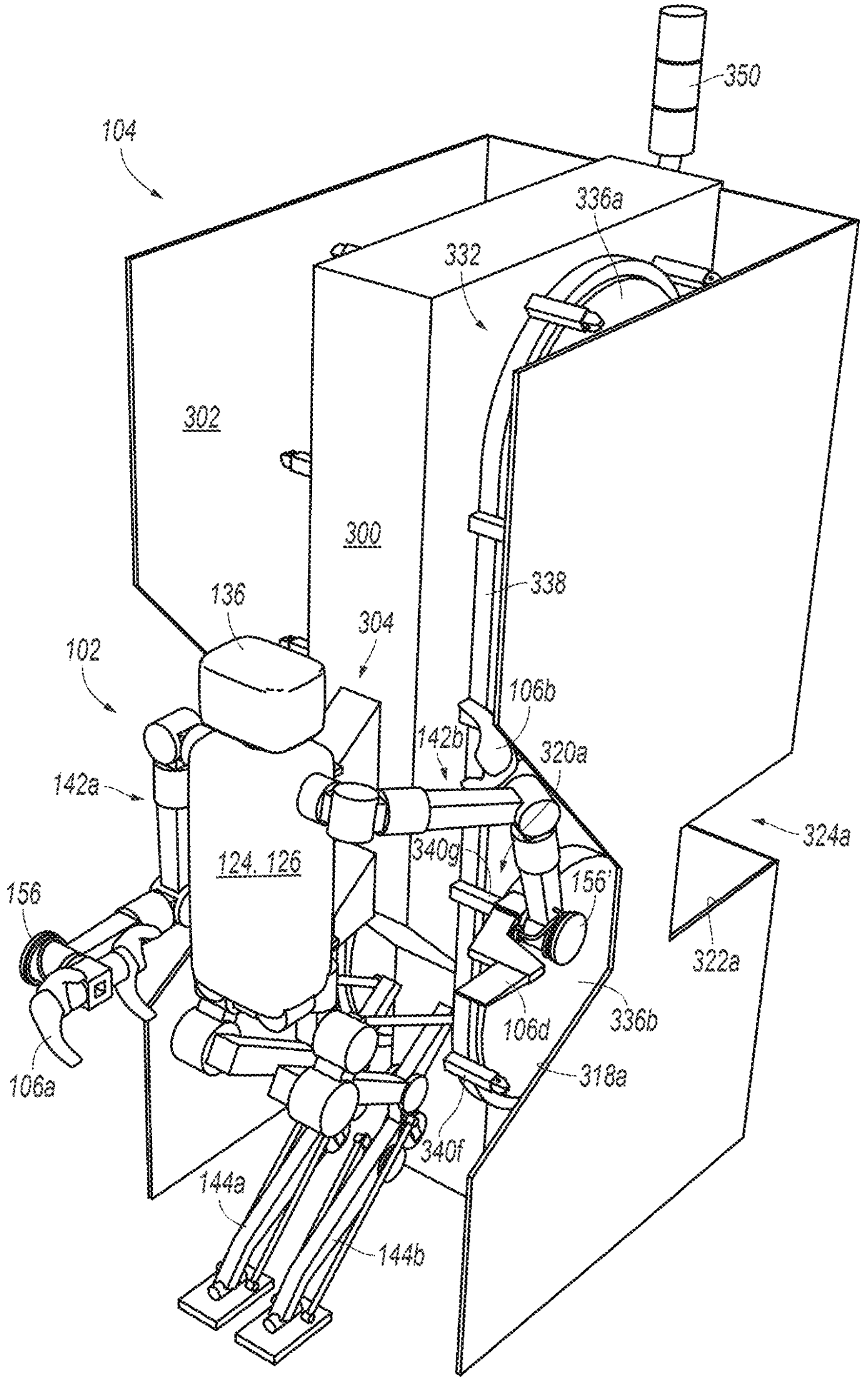

While or after connecting the storage connectors 262, 342, stowing the end effector 106*b* can include disconnecting the deployment connector 168 of the mobile robot 102 at the distal end portion 156 of the arm 142*b* and the deployment connector 250 of the end effector 106*b*. In at least some cases, this includes operating the clamp 172 via the electric motor 178 to release the spindle 252 of the deployment connector 250. As shown in FIG. 25, stowing the end effector 106*b* can further include moving the distal end portion 156 of the arm 142*b* anteriorly away from the first conveyor 332 while the end effector 106*b* remains on the first conveyor 332. Swapping the end effector 106*b* can further include staging a new end effector for retrieval. This can include As shown in FIG. 26, this can include operating the first conveyor 332 to move the end effector 106*b* away from the deploying region 320*a* and to move the end effector 106*d* to the deploying region 320*a* simultaneously. Next, swapping the end effector 106*b* can include retrieving the replacement end effector. As shown in FIG. 27, this can include again moving the distal end portion 156 of the arm 142*b* posteriorly toward the first conveyor 332 via the deploying port 318*a*. The mobile robot 102 can use the same or similar approaches to guiding movement of the distal end portion 156 of the arm 142*b* as those discussed above in the context of stowing the end effector 106*b*. Retrieving the end effector 106*d* can then include contacting the arm 142*b* and the end effector 106*d*.

After the initial contact, the method 500 can include operably connecting the distal end portion 156 of the arm 142*b* and the end effector 106*d* to one another. This can occur via the deployment connector 168 of the arm 142*b* and the deployment connector 270 of the end effector 106*d*. In at least some cases, establishing an operable connection includes clamping the spindle 252 of the deployment connector 270 via the clamp 172. Furthermore, establishing an operable connection can include operably connecting the fluidic ports 184, 254 of the deployment connectors 168, 270, respectively, to one another. Similarly, establishing an operable connection can include operably connecting the electrical port 192 and the electrical plug 260 of the deployment connector 168 and the deployment connector 270, respectively, to one another. In the case of the end effector 106*d*, the fluidic port 254 of the deployment connector 270 can be plugged because a fluidic connection between the mobile robot 102 and the end effector 106*d* is not needed.

Figure 28:
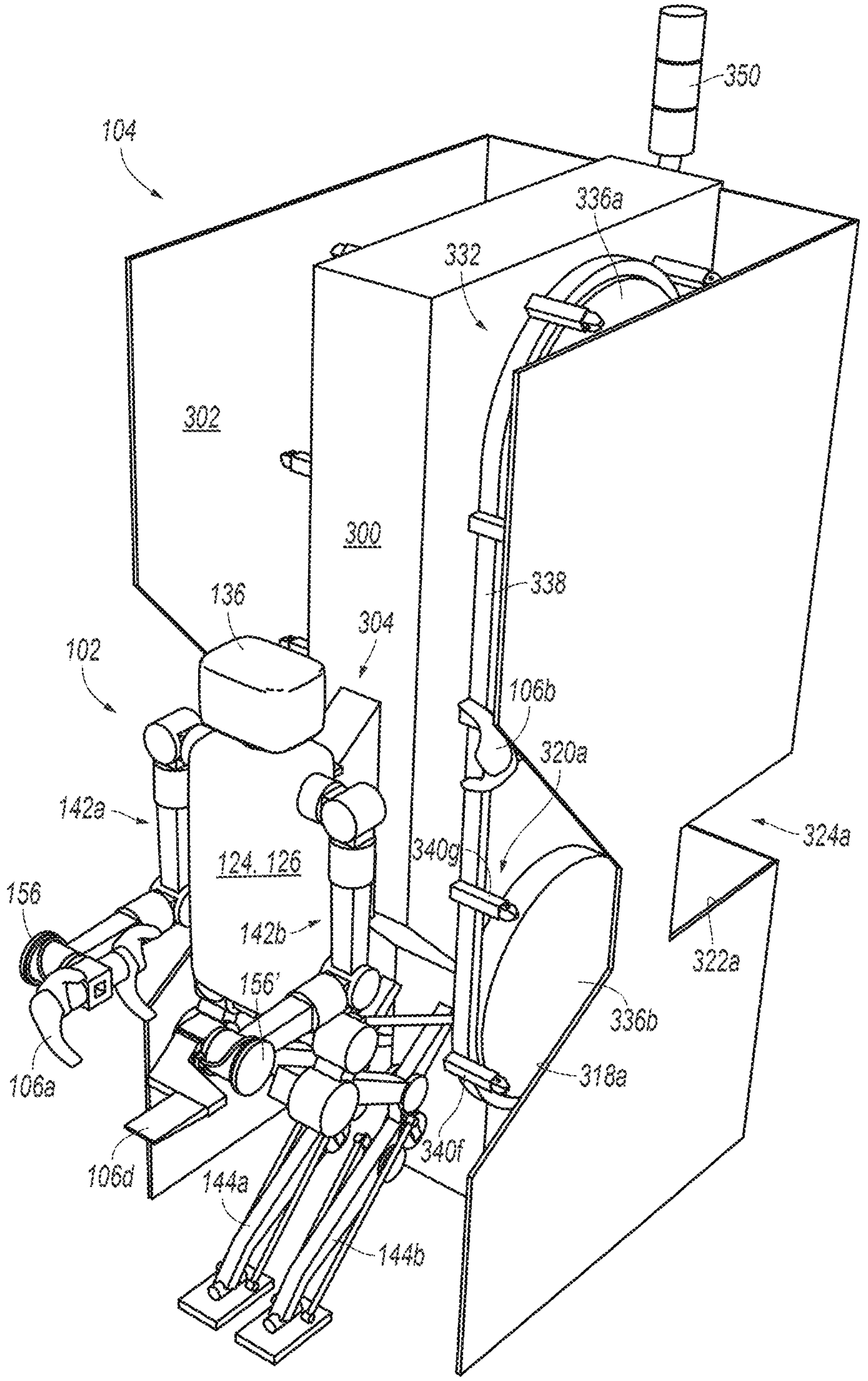
Figure 29:
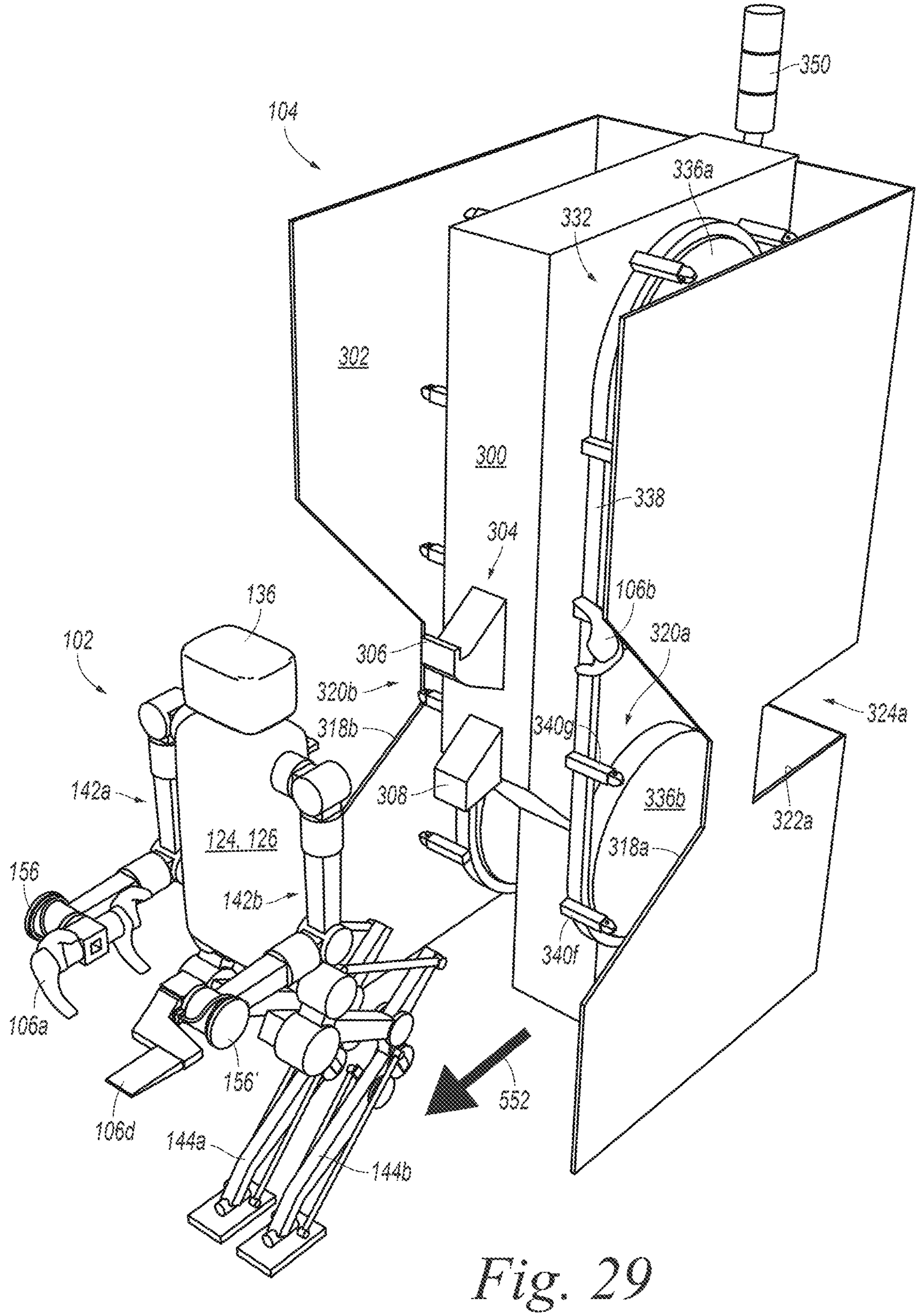

In at least some cases, operably connecting the deployment connectors 168, 270 to one another occurs while the storage connector 262 of the end effector 106*d* and the storage connector 342 of the station 104 at the attachment arm 340*h* are still connected. In these and other cases, the method 500 can include disengaging the end effector 106*d* from the station 104 after contacting the arm 142*b* and the end effector 106*d*. The disengaging can include disengaging the storage connectors 262, 342, which can include releasing a clasp, such as a spring clasp including the protrusions 344 and the indentations 290 (FIG. 12). Furthermore, the method 500 can include moving the arm 142*b* to disengage the end effector 106*d* from the station 104 as shown in FIG. 28. As shown in FIG. 29, the method 500 can further include moving the mobile robot 102 out of a docked state at the station 104 (block 502*g*) and ambulating the mobile robot 102 away from the station 104 (block 502*h*) via the legs 144*a*, 144*b* in the direction of arrow 552. The disengaging and ambulating away can include operations similar to but the reverse of the operations described above in connection with engaging the mobile robot 102 with the station 104 and with ambulating the mobile robot 102 toward the station 104.

In the illustrated example, the mobile robot 102 begins with the end effectors 106*a*, 106*b* equipped via the arms 142*a*, 142*b*, respectively, and ends with the end effectors 106*a*, 106*d* equipped via the arms 142*a*, 142*b*, respectively. In other examples, the mobile robot 102 may execute other end-effector changes, swaps, disengagements, engagements, etc. For example, the mobile robot 102 may change an end effector equipped via the arm 142*a* only or change both an end effector equipped via the arm 142*a* and an end effector equipped via the arm 142*b*. In the latter case, the changes can occur sequentially or simultaneously. Simultaneously changing end effectors of the arms 142*a*, 142*b* can be useful, for example, to reduce downtime for the mobile robot 102. In another example, the mobile robot 102 may begin with no equipped end effectors and end with an end effector equipped via the arm 142*a* and/or with an end effector equipped via the arm 142*b*. This may occur when the mobile robot 102 is introduced to a new facility or transferred within a facility between zones with different respective end-effector inventories, among other cases. In yet another example, the mobile robot 102 may begin with two equipped end effectors and end with no equipped end effectors. This may occur when the mobile robot 102 is reassigned out of a facility or zone, among other cases.

Figure 30:
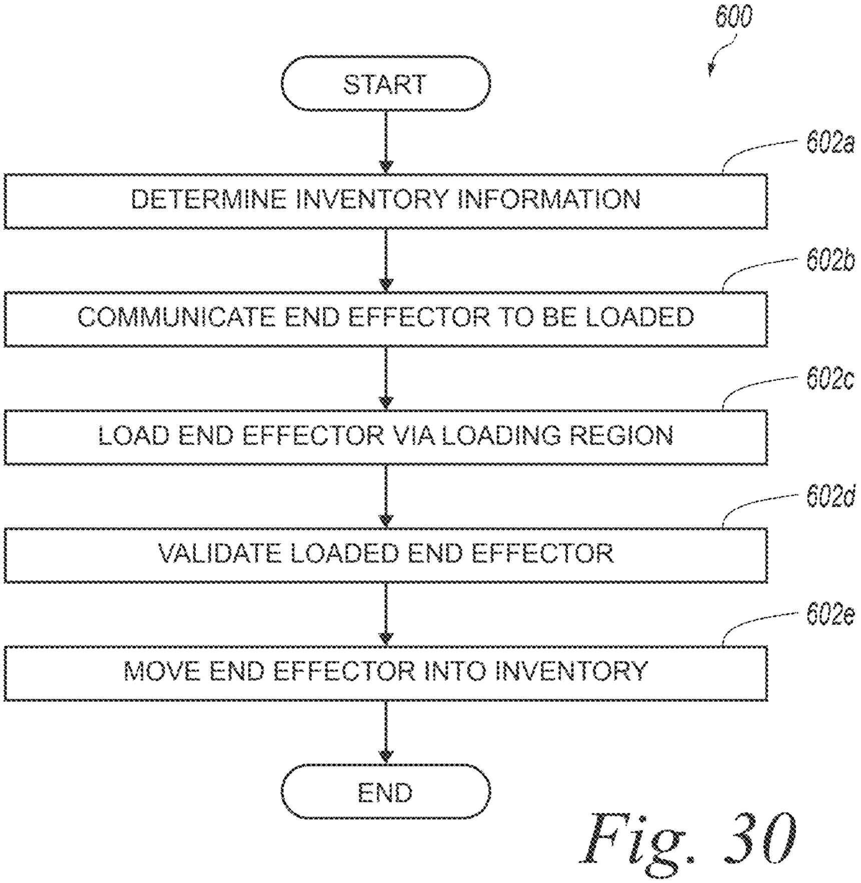
FIGS. 30 and 31 are block diagrams corresponding to other methods in accordance with at least some embodiments of the present technology.

FIG. 30 is a block diagram corresponding to another method 600 in accordance with at least some embodiments of the present technology. The diagram includes blocks 602*a*-602*e* corresponding to different respective portions of the method 600. The method 600 is related to servicing the station 104 and managing the end effectors 106. The method 600 can include determining inventory information (block 602*a*). This can include features corresponding to those described above in the context of the method 500. The method 600 can further include communicating information about an end effector to be loaded into the station 104 (block 602*b*). This communication can be with a human, with a mobile robot other than the mobile robot 102, or with another suitable entity. For example, the station 104, the controller 107, and/or other component of the system 100 may summon a human or another robot (e.g., a counterpart of the mobile robot 102) to the station 104 via the light stack 350, via one or more audio signals, via one or more wireless signals sent to a mobile device included in the user interface 414, to a communication component of the other robot, and/or in another suitable manner. At the station 104, communicating an end effector to be loaded can occur via the touchscreen 352 and/or in another suitable manner. The method 600 can further include loading one or more of the end effectors 106*a*-106*f* to the station 104 (block 602*c*), such as in response to the communication. This can occur via one or both of the loading ports 322*a*, 322*b*. Loading one or more of the end effector 106*a*-106*f* to the station 104 can include any suitable operations discussed above in the context of the method 500 for stowing the end effector 106*a*.

After a given one of the end effectors 106*a*-106*f* is loaded into the station 104, the method 600 can include gathering information about the loaded one of the end effectors 106*a*-106*f*. This can occur at least partially via the vision sensor 346. For example, the controller 107 can receive an image of the loaded one of the end effectors 106*a*-106*f* and identify the loaded one of the end effectors 106*a*-106*f* via an object-recognition algorithm. In addition or alternatively, the station 104 and the loaded one of the end effectors 106*a*-106*f* can include complementary features for Radio Frequency Identification (RFID) or another suitable electronic identification modality. For example, the station 104 and the loaded one of the end effectors 106*a*-106*f* can include an RFID reader (not shown) and an RFID tag (also not shown), respectively. In at least some cases, such RFID readers and tags are at or near an interface between the storage connector 262, 284 of the loaded one of the end effectors 106*a*-106*f* and the storage connector 342 of the station 104. In these and other cases, the method 600 can include validating the loaded one of the end effectors 106*a*-106*f* (block 602*d*). This can include determining that information gathered about the loaded one of the end effectors 106*a*-106*f* matches expected information. If the information does not match, the method 600 can include requesting that the loaded one of the end effectors 106*a*-106*f* be removed. The method 600 can further include moving the loaded one of the end effectors 106*a*-106*f* into an inventory of the station 104 (block 602*e*). This can include operating the first conveyor 332 or the second conveyor 334 to move the loaded one of the end effectors 106*a*-106*f* from the corresponding one of the loading regions 324*a*, 324*b*, such as toward the associated one of the deploying regions 320*a*, 320*b* along a conveyor path of the corresponding one of the first and second conveyors 332, 334.

Figure 31:
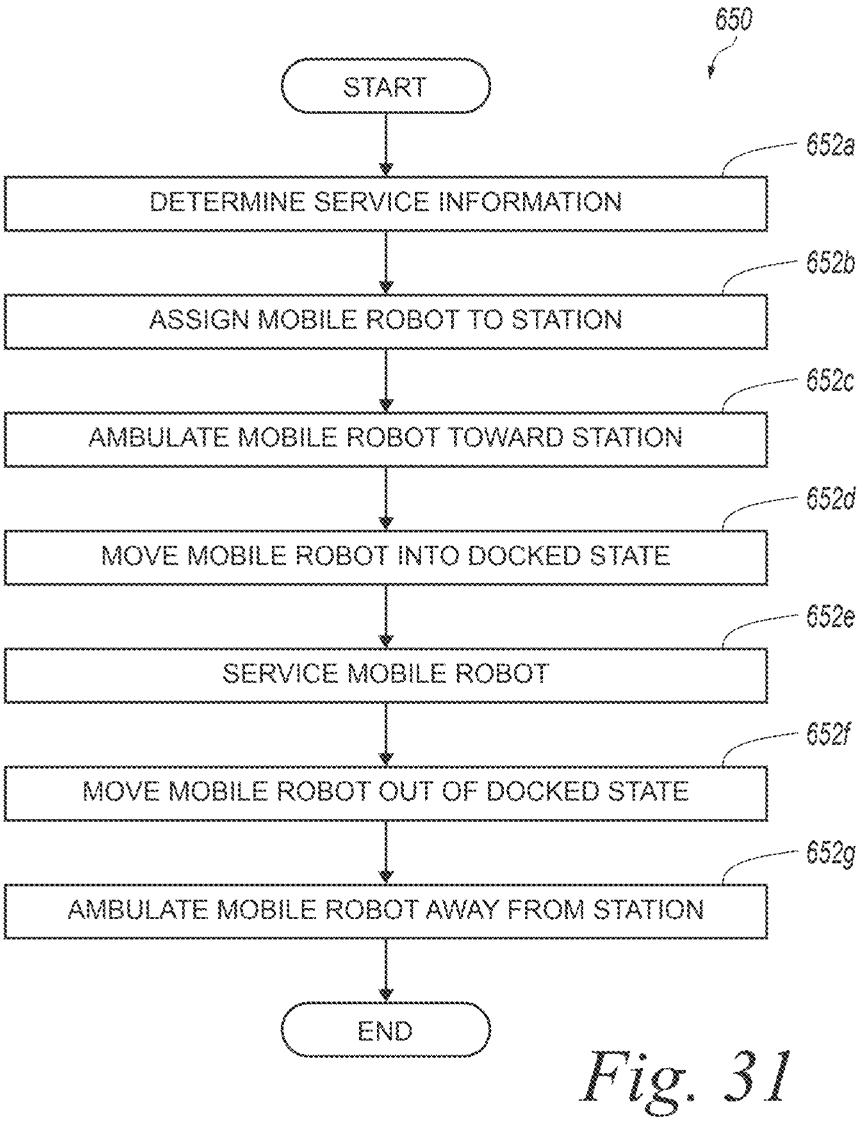

FIG. 31 is a block diagram corresponding to another method 650 in accordance with at least some embodiments of the present technology. The diagram includes blocks 652*a*-652*g* corresponding to different respective portions of the method 650. The method 650 is related to servicing the mobile robot 102 at the station 104. In at least some cases, the system 100 facilitates servicing the mobile robot 102 in connection with or separately from changing equipped end effectors of the mobile robot 102. The method 650 can include determining service information for the mobile robot 102 (block 652*a*). In an example, the mobile robot 102 may communicate a service issue via the controller 107. In another example, the controller 107 may determine service information for the mobile robot 102, such as an expiration or near expiration of a predetermined time, duty interval, etc. between routine service of the mobile robot 102. The method 650 can further include assigning the mobile robot 102 to the station 104 (block 652*b*), such as in response to determining the service information. The method 650 can further include ambulating the mobile robot 102 toward the station 104 (block 652*c*) and moving the mobile robot 102 into a docked state at the station 104 (block 652*d*). These operations can include any of the features described above in connection with corresponding operations in the method 500.

While the mobile robot 102 is in a docked state at the station 104, the method 650 can include servicing the mobile robot 102 (block 652*e*). The servicing can be by a human and/or by another robot (e.g., a counterpart of the mobile robot 102). Examples of types of servicing include cleaning, replacing components, inspecting, troubleshooting, diagnosing problems, etc. After servicing the mobile robot 102, the method 650 can include moving the mobile robot 102 out of a docked state at the station 104 (block 652*f*) and ambulating the mobile robot 102 away from the station 104 (block 652*g*). These operations can include any of the features described above in connection with corresponding operations in the method 500.

Figure 32:
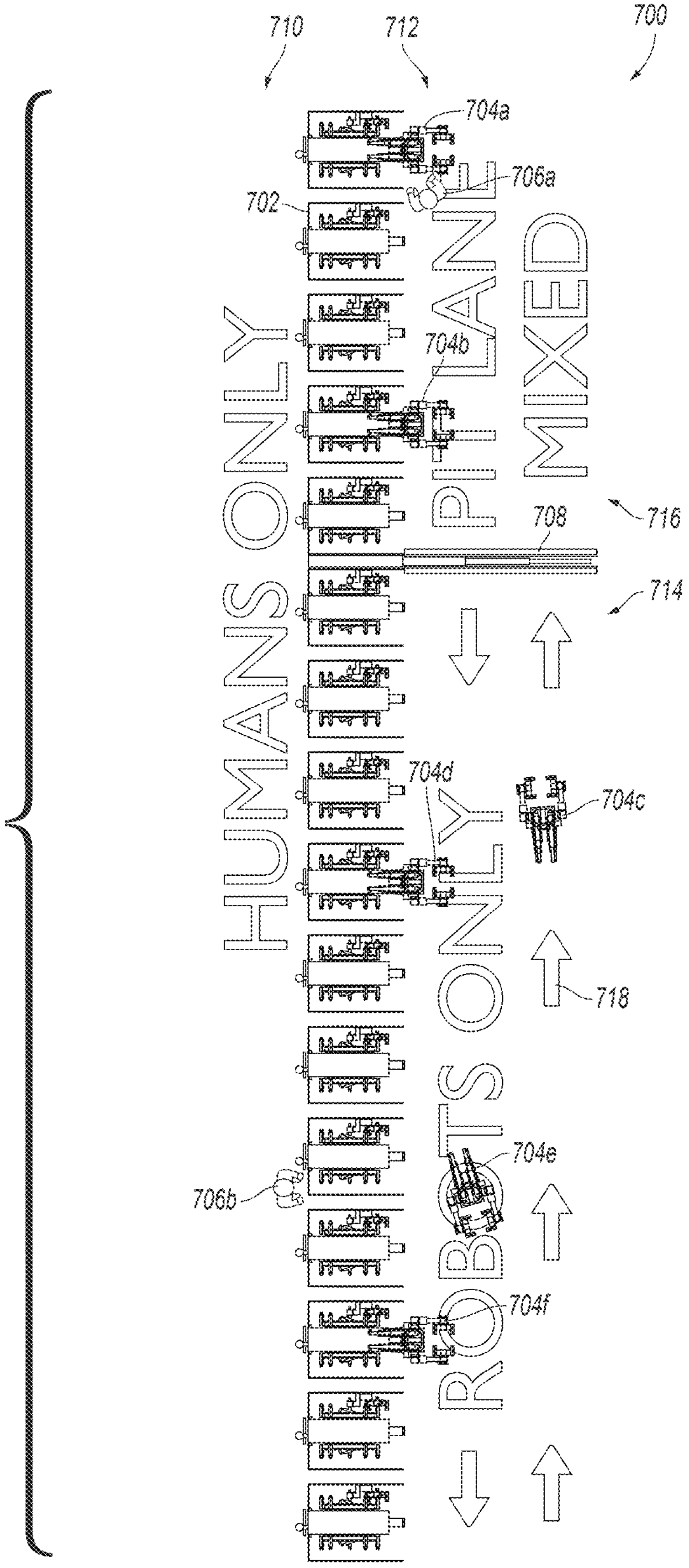
FIG. 32 is a top plan view of an environment related to the system of FIG. 1 at a time during examples of the methods of FIGS. 21, 30 and 31.
Figure 33:
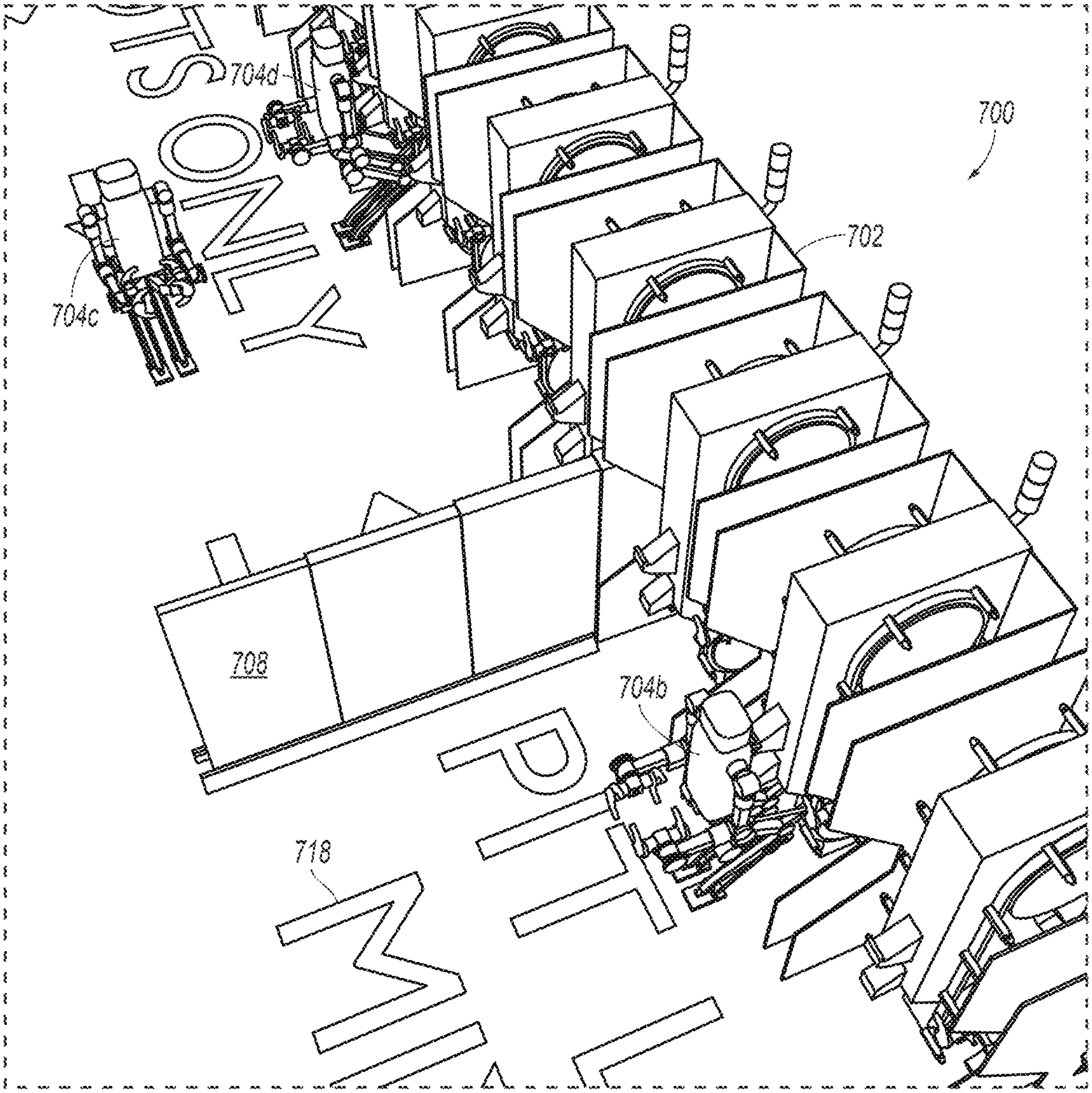
FIG. 33 is an enlarged perspective view of a portion of the environment of FIG. 32 at the time of FIG. 32.

FIG. 32 is a top plan view of an environment 700 related to the system 100 at a time during example of the methods 500, 600, 650. FIG. 33 is an enlarged perspective view of a portion of the environment 700 at the time of FIG. 32. With primary reference to FIGS. 1, 32 and 33 together, the environment 700 can include stations 702 (one labeled) corresponding to the station 104. The environment 700 can further include mobile robots 704 (individually identified as mobile robots 704*a*-704*f*) corresponding to the mobile robot 102. The mobile robots 704*a*, 704*b*, 704*d*, 704*f* are shown docked. The mobile robots 704*c*, 704*e* are shown undocked. The environment 700 can also include humans 706 (individually identified as humans 706*a*, 706*b*) and a partition 708. The stations 702 can be arranged in a row that divides the environment 700 into a first zone 710 and a second zone 712. The partition 708 can divide the second zone 712 into a first subzone 714 and a second subzone 716. The environment 700 can include floor markings 718 (one labeled) that provide information about the first zone 710, the first subzone 714, and the second subzone 716. In the illustrated case, the first zone 710, the first subzone 714, and the second subzone 716 are intended during normal operation for humans only, robots only, and a mix, respectively. The first zone 710, the first subzone 714, and the second subzone 716 can have different protocols and features corresponding to these different occupancies. For example, safety protocols for the humans 706*a*, 706*b* at the second subzone 716 can be stricter than those at the first zone 710. Similarly, mobile robots 704 can operate in a different (e.g., slower) state at the second subzone 716 than at the first subzone 714.

In at least some cases, different operations occur at the different zones and subzones of the environment 700. For example, loading and servicing of the stations 702 can occur at least primarily via the first zone 710. As another example, autonomous charging and end-effector changing can occur at least primarily via the first subzone 714. As another example, servicing the mobile robots 704*a*-704*f* can occur at least primarily via the second subzone 716. Other differences in activities at the zones and subzones are also possible. Furthermore, the partition 708 can be movable to change an allocation of the stations 702 among the stations 702 among the first and second subzones 714, 716 according to demand. In at least some cases, the partition 708 includes different indicators (not shown) at its opposite major sides, respectively. These indicators can instruct the mobile robots 704*a*-704*f* and/or the humans 706*a*, 706*b* of appropriate operational protocols for the corresponding ones of the first and second subzones 714, 716. In addition or alternatively, the environment 700 can include virtual fencing and/or another system through which the mobile robots 704*a*-704*f* can determine entry into, exit from, and/or occupancy of the first and second subzones 714, 716. This can be useful, for example, to inform changes between operating states in accordance with different respective safety protocols of the first and second subzones 714, 716, as discussed above.

Figure 34:
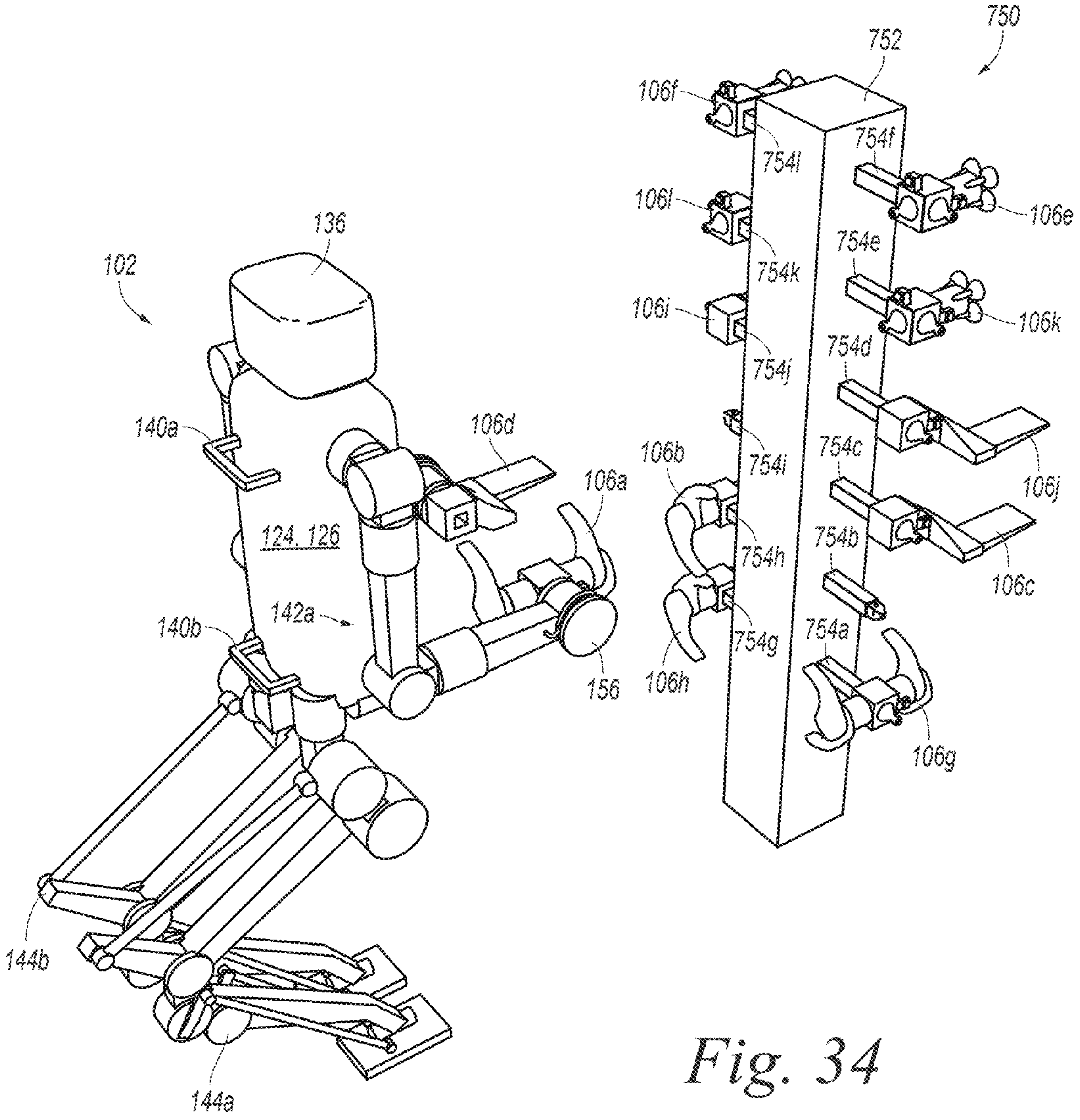
FIG. 34 is a perspective view of the mobile robot and selected end effectors of the system of FIG. 1 along with a different station during an example of a method in accordance with at least some embodiments of the present technology.

FIG. 34 is a perspective view of the mobile robot 102, selected end effectors 106, and a station 750 during an example of a method in accordance with at least some embodiments of the present technology. As discussed above, changing end effectors need not include docking and/or charging the mobile robot 102. With reference to FIG. 34, the station 750 can include a tower 752 and attachment arms 754 (individually identified as attachment arms 754*a*-754*l*) extending laterally from the tower 752. In particular, the attachment arms 754*a*-754*f* are shown extending laterally from the tower 752 in one direction while the attachment arms 754*g*-754*l* are shown extending laterally from the tower 752 in the opposite direction. The attachment arms 754*a*-754*l* can be the same as or similar to the attachment arms 340*a*-340*k* discussed above in the context of the station 104. As shown in FIG. 34, the mobile robot 102 can approach the tower 752 anteriorly. The mobile robot 102 can also extend the arms 142*a*, 142*b* anteriorly to interact with the station 104. In at least some cases, the station 750 carries end effectors of opposite respective chiralities at opposite respective sides of the tower 752. This can be useful, for example, to facilitate stowing and retrieving different respective end effectors for the arms 142*a*, 142*b* simultaneously.

In the illustrated embodiment, the tower 752 is fixed. In another embodiment, a counterpart of the stations 104, 750 can include a movable tower, such as a tower that rotates about a vertical axis. Furthermore, a counterpart of the stations 104, 750 can include a conveyor configured to carry stowed end effectors from a location less accessible to the mobile robot 102 to a location more accessible to the mobile robot 102. In a particular example, a counterpart of the stations 104, 750 without docking or charging functionality is the same as or similar to the station 104, but with the housing 302, the support 304, and the stop 308 omitted. In yet another example, a system including a station (e.g., the station 104 or the station 750) further includes a substation (not shown) configured to carry a smaller number of stowed end effectors than the corresponding station. A substation can be located nearer to a work location for the mobile robot 102 than a corresponding station. For example, a piece of equipment (e.g., a conveyor, a put wall, a container port of a storage rack, a cart, a pallet jack, etc.) can include a substation that stowed carries end effectors suitable for work associated with that piece of equipment. For example, an item-handling conveyor can include a stowed end effector suitable for item handling whereas a tote handling conveyor can include a stowed end effector suitable for tote handling.

Still further, the mobile robot 102 itself can be configured to carry stowed end effectors directly or via one or more accessories. This can facilitate convenient deployment and/or swapping of end effectors as needed. For example, a counterpart of the mobile robot 102 can include fixed or removable counterparts of the attachment arms 340, 754 extending outwardly from the torso 126, from the arms 142*a*, 142*b* (e.g., for cross deployment to the opposite arms), from the legs 144*a*, 144*b*, etc. Locations at which the mobile robot carries stowed end effectors can be selected to reduce or eliminate the possibility of interfering with other operations of the mobile robot. In an example, the mobile root 102 can carry stowed end effectors via an accessory (not shown) configured to be secured to another part of the mobile robot 102. For example, the mobile root 102 can carry stowed end effectors via a toolbelt-like accessory including a strap that extends circumferentially around the inferior portion 130 of the torso 126. Together, any or all of the stations 104, 750, equipment-based substations, other types of substations, robot-carried attachment structures, etc., can facilitate efficient deployment of different types of end effectors throughout a work environment.

Figure 35:
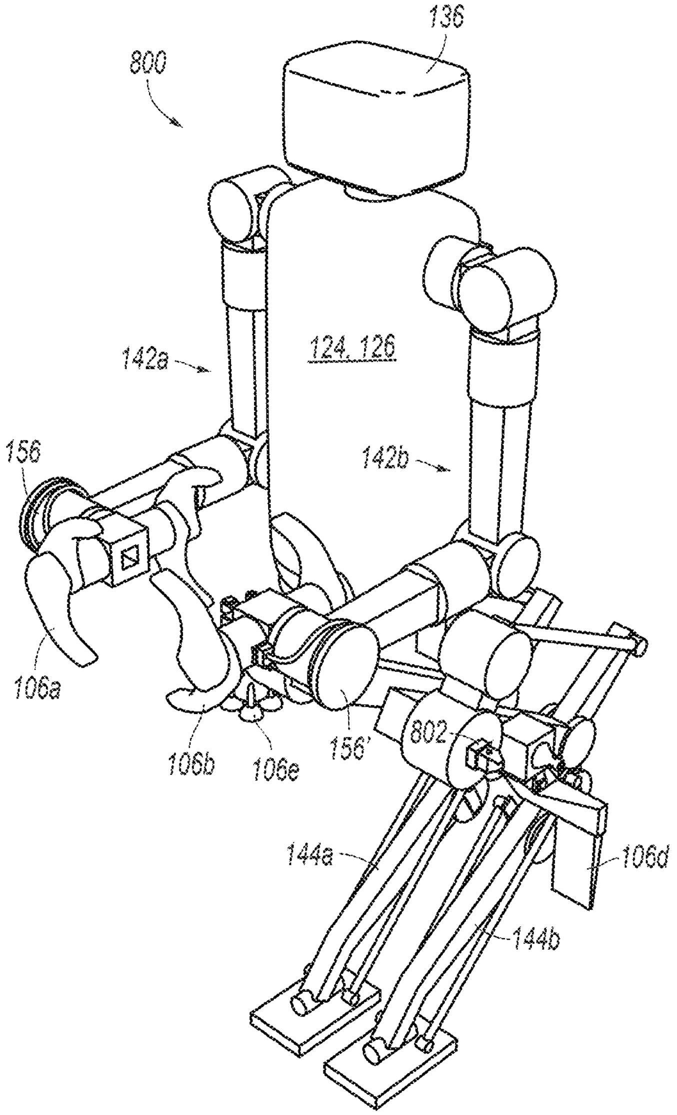
FIG. 35 is a perspective view of selected end effectors of a system of FIG. 1 along with a different mobile robot during an example of a method in accordance with at least some embodiments of the present technology.

FIG. 35 is a perspective view of selected end effectors along with a different mobile robot 800 during an example of a method in accordance with at least some embodiments of the present technology. As shown in FIG. 35, the mobile robot 800 can include storage connectors 802 (one shown) at which the mobile robot 800 is configured to carry individual end effectors. The storage connectors 802 can be similar to the attachment arms 340, 754 discussed above. The mobile robot 800 can carry the end effectors 106*d*, 106*e* via different respective storage connectors 802 while carrying the end effector 106*a* deployed at the distal end portion 156 of the arm 142*a* and while carrying the end effector 106*b* deployed at the distal end portion 156' of the arm 142*b*. The mobile robot 800 can be configured to change deployed and stowed end effectors as needed. For example, from the state shown in FIG. 35, the mobile robot 800 can move the arm 142*b* to stow the end effector 106*b* at an available one of the storage connectors 802 and then move the arm 142*b* again to deploy the end effector 106*d* while the end effector 106*b* remains stowed. In the illustrated case, the mobile robot 800 includes four storage connectors 802, including two at each of the legs 144*a*, 144*b*. In other cases, a counterpart of the mobile robot 800 can include a different quantity and/or arrangement of storage connectors 802. For example, a counterpart of the mobile robot 800 can include one, two, or more storage connectors 802 at the torso 126, such as at an anterior side of the torso 126. Other suitable locations for stowed end effectors are also possible.

CONCLUSION

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may be disclosed herein in the context of those embodiments, other embodiments may also exhibit such advantages, and not all embodiments need necessarily exhibit such advantages or other advantages disclosed herein to fall within the scope of the present technology. This disclosure and the associated technology can encompass other embodiments not expressly shown or described herein.

Throughout this disclosure, the singular terms “a,” “an,” and “the” include plural referents unless the context clearly indicates otherwise. Similarly, unless the word “or” is expressly limited to mean only a single item exclusive from the other items in reference to a list of two or more items, then the use of “or” in such a list is to be interpreted as including (a) any single item in the list, (b) all of the items in the list, or (c) any combination of the items in the list. As used herein, the terms “generally,” “substantially,” “about,” and similar terms are used as terms of approximation and not as terms of degree, and are intended to account for the inherent variations in measured or calculated values that would be recognized by those of ordinary skill in the art. Additionally, the terms “comprising,” “including,” “having,” and the like are used throughout this disclosure to mean including at least the recited feature(s) such that any greater number of the same feature(s) and/or one or more additional types of features are not precluded. This is the case even if a particular number of features is specified unless that specified number is preceded by the word “exactly” or another clear indication that it is intended to be closed ended. In a particular example, “comprising two arms” means including at least two arms. References herein to any of receiving, determining, generating, or selecting information in accordance with various embodiments of the present technology encompass, when feasible, the others of receiving, determining, generating, and selecting the information and indicate that such operations can occur at least partially via the relevant computing subsystem(s).

Directional terms, such as “upper,” “lower,” “front,” “back,” “vertical,” and “horizontal,” may be used herein to express and clarify the relationship between various structures. It should be understood that such terms do not denote absolute orientation. Reference herein to “one embodiment,” “an embodiment,” or similar phrases means that a particular feature, structure, or operation described in connection with such phrases can be included in at least one embodiment of the present technology. Thus, such phrases as used herein are not all referring to the same embodiment. Unless preceded with the word “conventional,” references herein to “counterpart” devices, systems, methods, features, structures, or operations refer to devices, systems, methods, features, structures, or operations in accordance with at least some embodiments of the present technology that are similar to a described device, system, method, feature, structure, or operation in certain respects and different in other respects. Finally, it should be noted that various particular features, structures, and operations of the embodiments described herein may be combined in any suitable manner in additional embodiments in accordance with the present technology.

We claim:

1. A method comprising:

ambulating a mobile robot toward a station via legs of the mobile robot, wherein the legs are connected to the mobile robot via a body of the mobile robot;

transferring weight of the mobile robot from at least one of the legs to the station after ambulating the mobile robot toward the station;

contacting an arm of the mobile robot and an end effector carried by the station after transferring weight of the mobile robot from at least one of the legs to the station, wherein the arm is connected to the mobile robot via the body;

disengaging the end effector from the station after contacting the arm and the end effector; and ambulating the mobile robot away from the station via the legs after disengaging the end effector from the station and while the end effector is operably connected to the mobile robot via the arm.

2. The method of claim 1, further comprising operably connecting a distal end portion of the arm and the end effector to one another via complementary deployment connectors of the mobile robot and the end effector, respectively, after contacting the distal end portion of the arm and the end effector and before disengaging the end effector from the station.

3. The method of claim 2, wherein:

disengaging the end effector from the station includes disengaging complementary storage connectors of the station and the end effector, respectively; and the deployment and storage connectors of the end effector are separate from one another.

4. The method of claim 2, wherein:

the deployment connector of the end effector includes a spindle;

the deployment connector of the mobile robot includes a clamp; and operably connecting the distal end portion of the arm and the end effector to one another includes clamping the spindle via the clamp.

5. The method of claim 2, wherein operably connecting the distal end portion of the arm and the end effector to one another includes operably connecting respective fluidic ports of the deployment connectors to one another.

6. The method of claim 1, wherein disengaging the end effector from the station includes moving the arm to disengage the end effector from the station.

7. The method of claim 1, further comprising:

determining inventory information for the station at a controller operably associated with the mobile robot, wherein the inventory information includes an indication that the end effector is available at the station; and assigning the mobile robot to the station based at least partially on the indication, wherein ambulating the mobile robot toward the station includes ambulating the mobile robot toward the station at least partially in response to assigning the mobile robot to the station.

8. The method of claim 1, further comprising electrically charging a battery of the mobile robot via the station after transferring weight of the mobile robot from at least one of the legs to the station.

9. The method of claim 8, wherein:

transferring weight of the mobile robot from at least one of the legs to the station includes transferring weight of the mobile robot from at least one of the legs to the station via contact between the mobile robot and a support of the station; and electrically charging the battery includes electrically charging the battery via the contact between the mobile robot and the support.

10. The method of claim 1, further comprising moving a distal end portion of the arm posteriorly and toward the end effector after transferring weight of the mobile robot from at least one of the legs to the station and before contacting the arm and the end effector.

11. The method of claim 1, wherein:

the method further comprises moving a distal end portion of the arm toward the end effector via a deploying port of the station after transferring weight of the mobile robot from at least one of the legs to the station and before contacting the arm and the end effector;

the station defines a deploying region at the deploying port; and the method further comprises operating a conveyor of the station to move the end effector to the deploying region before contacting the arm and the end effector.

12. The method of claim 11, wherein:

the end effector is a first end effector;

ambulating the mobile robot toward the station includes ambulating the mobile robot toward the station while a second end effector is operably connected to the mobile robot via the arm; and the method further comprises stowing the second end effector at the deploying region before contacting the arm and the first end effector.

13. The method of claim 12, wherein:

stowing the second end effector includes stowing the second end effector on the conveyor; and operating the conveyor to move the first end effector to the deploying region includes operating the conveyor to simultaneously move the first end effector toward the deploying region and move the second end effector away from the deploying region.

14. The method of claim 13, wherein stowing the second end effector on the conveyor includes:

connecting complementary storage connectors of the station and the second end effector; and disconnecting complementary deployment connectors of the mobile robot and the second end effector after connecting the complementary storage connectors.

15. The method of claim 11, wherein:

the method further comprises loading the end effector to the station via a loading port of the station, wherein the loading port is separate from the deploying port;

the station defines a loading region at the loading port; and the method further comprises operating the conveyor to move the end effector from the loading region toward the deploying region after loading the end effector to the station and before contacting the arm and the end effector.

16. The method of claim 11, wherein:

the arm, the end effector, the conveyor, the deploying port, and the deploying region are a first arm, a first end effector, a first conveyor, a first deploying port, and a first deploying region, respectively;

the method further comprises:

operating a second conveyor of the station to move a second end effector carried by the station to a second deploying region of the station, moving a distal end portion of a second arm of the mobile robot toward the second end effector via a second deploying port of the station after transferring weight of the mobile robot from at least one of the legs to the station, wherein the second arm is connected to the mobile robot via the body, and wherein the first and second deploying ports are separate from one another, contacting the second arm and the second end effector after transferring weight of the mobile robot from at least one of the legs to the station, and disengaging the second end effector from the station after contacting the second arm and the second end effector; and ambulating the mobile robot away from the station includes ambulating the mobile robot away from the station after disengaging the second end effector from the station and while the second end effector is operably connected to the mobile robot via the second arm.

17. The method of claim 16, wherein:

transferring weight of the mobile robot from at least one of the legs to the station includes transferring weight of the mobile robot from at least one of the legs to a support of the station;

the station includes a pillar carrying the support;

the first deploying region, the pillar, and the second deploying region are at first, second, and third vertical planes, respectively;

the first, second, and third vertical planes are parallel to one another; and the second vertical plane is between the first and third vertical planes.

18. A method comprising:

ambulating a mobile robot toward a station via legs of the mobile robot, wherein the legs are connected to the mobile robot via a body of the mobile robot;

transferring weight of the mobile robot from at least one of the legs to the station after ambulating the mobile robot toward the station;

moving a first end effector of the mobile robot from a first deployed state at a distal end portion of an arm of the mobile robot to a non-deployed state;

contacting a second end effector of the mobile robot and the distal end portion of the arm after moving the first end effector to the non-deployed state and while the mobile robot carries the second end effector in a stowed state; and moving the second end effector from the stowed state to a second deployed state at the distal end portion of the arm after contacting the second end effector and the distal end portion of the arm.

19. The method of claim 18, wherein:

the stowed state is a second stowed state;

the non-deployed state is a first stowed state; and the method further comprises carrying the first end effector in the first stowed state via the mobile robot after moving the second end effector from the second stowed state to the second deployed state.

* * * * *